(12) United States Patent
Ren et al.

(10) Patent No.: US 11,816,574 B2
(45) Date of Patent: Nov. 14, 2023

(54) STRUCTURED PRUNING FOR MACHINE LEARNING MODEL

(71) Applicant: Alibaba Group Holding Limited, Grand Cayman (KY)

(72) Inventors: Ao Ren, Sunnyvale, CA (US); Yuhao Wang, Sunnyvale, CA (US); Tao Zhang, Sunnyvale, CA (US); Yuan Xie, Sunnyvale, CA (US)

(73) Assignee: Alibaba Group Holding Limited, George Town (KY)

( * ) Notice: Subject to any disclaimer, the term of this patent is extended or adjusted under 35 U.S.C. 154(b) by 1009 days.

(21) Appl. No.: 16/664,616

(22) Filed: Oct. 25, 2019

(65) Prior Publication Data

US 2021/0125071 A1   Apr. 29, 2021

(51) Int. Cl.
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 5,636,326 A | 6/1997 | Stork et al. | |
| 10,127,495 B1 * | 11/2018 | Bopardikar | G06F 1/32 |
| 11,392,829 B1 * | 7/2022 | Pool | G06N 3/08 |
| 2016/0299926 A1 | 10/2016 | Raghunathan et al. | |
| 2017/0262737 A1 | 9/2017 | Rabinovich et al. | |
| 2017/0337471 A1 | 11/2017 | Kadav et al. | |
| 2018/0082181 A1 | 3/2018 | Brothers et al. | |
| 2018/0114114 A1 | 4/2018 | Molchanov et al. | |
| 2018/0181867 A1 * | 6/2018 | Seibold | G06K 9/6253 |
| 2019/0130271 A1 | 5/2019 | Narang et al. | |

(Continued)

OTHER PUBLICATIONS

Wang et al., "Structured Probabilistic Pruning for Convolutional Neural Network Acceleration", In Proceedings of the British Machine Vision Conference (BMVC), 2018 (Year: 2018).*

(Continued)

*Primary Examiner* — Alexey Shmatov
*Assistant Examiner* — Beatriz Ramirez Bravo
(74) *Attorney, Agent, or Firm* — Lee & Hayes, P.C.

(57) ABSTRACT

An input weight pattern of a machine learning model may be received. The input weight pattern may be pruned to produce an output weight pattern based on a predetermined pruning algorithm. The pruning algorithm may include partitioning the input weight pattern into a plurality of sub-patterns, each row of the input weight pattern including sub-rows of a first number of sub-patterns, and each column of the input weight pattern including sub-columns of a second number of sub-patterns; and pruning sub-columns and sub-rows from the plurality of sub-patterns to achieve predetermined column and row sparsities respectively, with a constraint that at least one sub-row in each row of the input weight pattern is not pruned. The output weight pattern may further be compressed to produce a compact weight pattern. The compact weight pattern has lower memory and computational overheads as compared to the input weight pattern for the machine learning model.

20 Claims, 14 Drawing Sheets

(56) References Cited

U.S. PATENT DOCUMENTS

| | | | |
|---|---|---|---|
| 2019/0180184 A1 | 6/2019 | Deng et al. | |
| 2019/0228274 A1 | 7/2019 | Georgiadis et al. | |
| 2019/0244103 A1 | 8/2019 | Wang et al. | |
| 2019/0279089 A1 | 9/2019 | Wang | |
| 2019/0347554 A1* | 11/2019 | Choi | G06N 3/082 |
| 2019/0362235 A1 | 11/2019 | Xu et al. | |
| 2019/0378037 A1* | 12/2019 | Kale | G06N 20/00 |
| 2020/0364573 A1* | 11/2020 | Ramachandran | G06F 9/3455 |

OTHER PUBLICATIONS

Li et al., Enabling High Performance Deep Learning Networks on Embedded Systems, ACM, (2017) (Year: 2017).*

Ji, et. al., "Tetris: Tile-Matching the tremendous irregular sparsity," Advances in Neural Information Processing Systems, 2018, Retrieved from <<http://papers.neurips.cc/paper/7666-tetris-tile-matching-the-tremendous-irregular-sparsity.pdf>>.

Liu, et. al., "AutoCompress: An Automatic DNN structured pruning framework for ultra-high compression rates," arXiv preprint arXiv, Sep. 11, 2019, Retrieved from <<https://arxiv.org/pdf/1907.03141.pdf>>.

The PCT Search Report and Written Opinion dated Jan. 27, 2021 for PCT application No. PCT/US20/56084, 11 pages.

Wang, et. al., "EigenDamage: Structured pruning in the kronecker-factored eigenbasis," arXiv Preprint, May 15, 2019, Retreived from: <<http://proceedings.mlr.press/v97/wang19g/wang 19g.pdf>>.

Yao, et. al., "Balanced Sparsity for Efficient DNN Inference on GPU," Proceedings of the AAAI Conference on Artificial Intelligence, Jul. 17, 2019, retrieved from <<https:/lwww.microsoft.com/en-us/research/uploads/prod/2019/05/aaai19-2.pdf>>.

The International Preliminary Report on Patentability for PCT Application No. PCT/US20/56084, dated May 5, 2022, 10 pages.

* cited by examiner

STRUCTURED PRUNING FOR MACHINE LEARNING MODEL

BACKGROUND

With the advent and development of neural network technologies, various types of neural network models have been explored and applied in a number of real-world applications, which include, for example, speech recognition, natural language processing (NLP), forecasting, data validation, risk management, etc. Given a specific application, such as speech recognition, a neural network model may be trained to learn rules and patterns associated with such application from training samples. Such learned rules and patterns are represented and stored in a form of weights (or strengths) of connections between nodes within and among layers of the neural network model, and are usually expressed using a weight matrix.

For a real-world application, such a weight matrix is usually very large in size and thus occupies a large amount of memory, thus incurring a large memory overhead. Furthermore, when a prediction or decision using the neural network model (for example, determining whether a voice is uttered by a certain person) is performed, a tremendous number of multiplication and addition/accumulation operations with the weight matrix are needed to be performed to produce an output for such prediction or decision. This undoubtedly further incurs a huge computational cost or overhead every time when a prediction or decision is performed. These memory and computational overheads severely impact the usability and performance of neural networks in terms of memory and time, and may limit the uses of neural networks to computing systems that have high memory and computational capabilities.

SUMMARY

This summary introduces simplified concepts of structured pruning, which will be further described below in the Detailed Description. This summary is not intended to identify essential features of the claimed subject matter, nor is it intended for use in limiting the scope of the claimed subject matter.

This application describes example implementations of structured pruning for machine learning model. In implementations, an input weight pattern of a machine learning model (such as a neural network model) may be received. A block-wise row and column pruning (BRCP) algorithm may be performed on the input weight pattern to produce an output weight pattern for the machine learning model. The block-wise row and column pruning algorithm may include partitioning the input weight pattern into a plurality of sub-patterns. For example, each row of the input weight pattern may be divided into a first number of sub-rows (i.e., sub-rows of the first number of sub-patterns), and each column of the input weight pattern may be divided into a second number of sub-columns (i.e., sub-columns of the second number of sub-patterns). The block-wise row and column pruning algorithm may further include pruning sub-columns and sub-rows from the plurality of sub-patterns to achieve predetermined column and row sparsities respectively, with a constraint that at least one sub-row in each row of the input weight pattern is not pruned. In implementations, the first number may or may not be the same as the second number.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
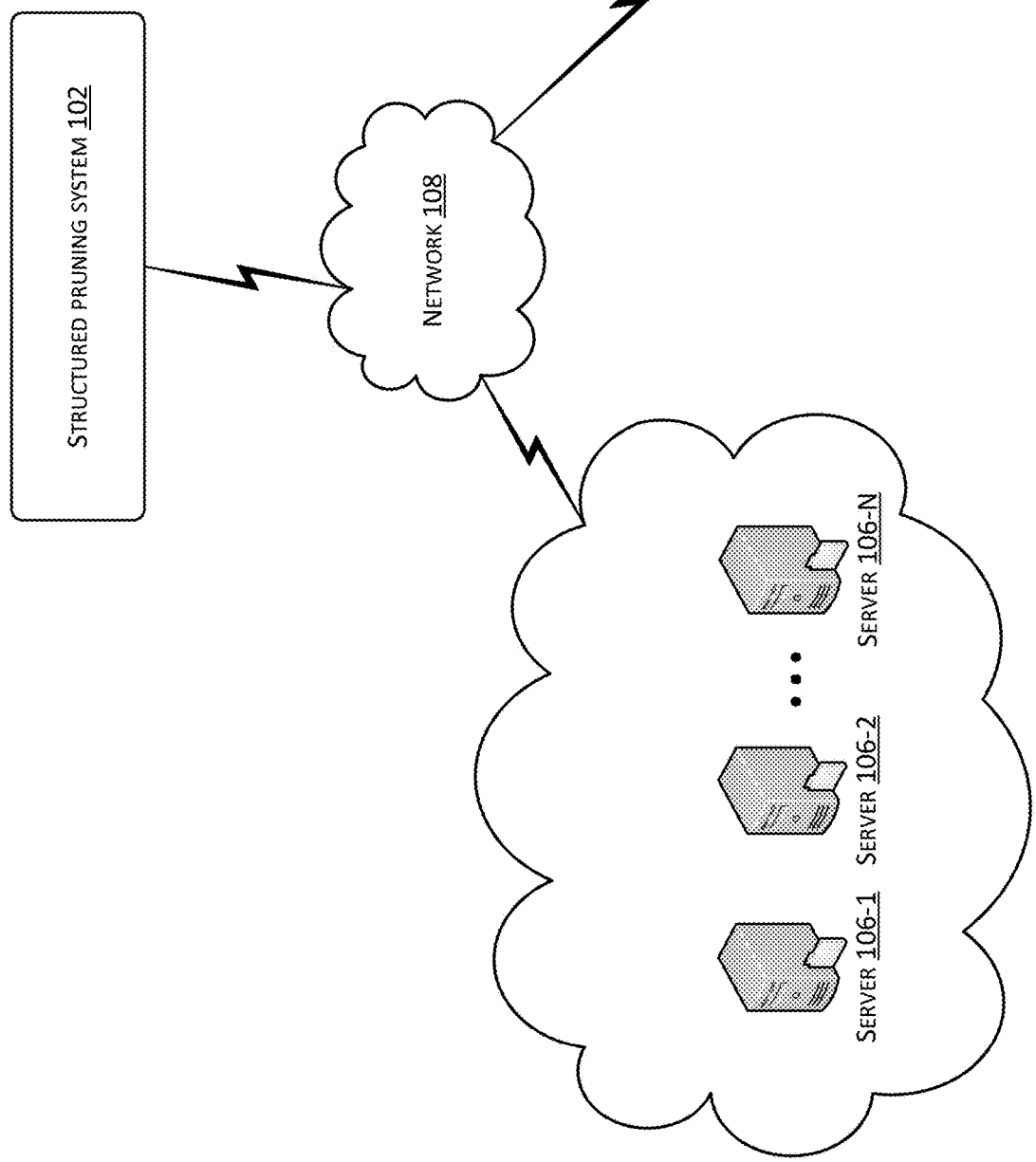
FIG. 1 illustrates an example environment in which a structured pruning system may be used.

As noted above, an existing machine learning model (such as a neural network model) for any real-world application usually includes a large weight matrix that occupies a huge amount of memory space and requires a tremendous amount of computational operations (such as multiplication and addition/accumulation operations) with the weight matrix in order to produce an output for prediction or determination in the real-world application. This undoubtedly impacts the usability and performance of machine learning models in daily life applications, and may limit the uses of the machine learning models to large-scale computing systems that possess large memory and computational capabilities.

This disclosure describes an example structured pruning system. The structured pruning system may convert an input weight pattern (e.g., a weight matrix) of a machine learning model into an output weight pattern that is sparser than the input weight pattern in a structured manner, and may further compress the output weight pattern in such a way that is hardware friendly, i.e., a compressed weight pattern is organized in a way that facilitates computations using hardware. In implementations, the neural network model with the output or compressed weight pattern can have a recognition accuracy that is similar to that of the neural network model with the input weight pattern. In implementations, the machine learning model may include a learning model having one or more weight patterns, which may include, but is not limited to, a neural network model (a recurrent neural network, a long short-term memory network, etc.), a clustering model (such as a hierarchical clustering model, etc.), a Bayesian network, etc.

In implementations, the structured pruning system may receive an input weight pattern of a machine learning model (such as a neural network model), and apply a block-wise row and column pruning (BRCP) algorithm on the input weight pattern to produce an output weight pattern. In implementations, the BRCP algorithm may include partitioning the input weight pattern into a plurality of sub-patterns (e.g., blocks of n rows and m columns, where n and m are positive integers greater than one), with each row of the input weight pattern including sub-rows of a first number of sub-patterns, and each column of the input weight pattern including sub-columns of a second number of sub-patterns. The BRCP algorithm may then include pruning sub-columns and sub-rows from the plurality of sub-patterns to achieve predetermined column and row sparsities respectively, with a constraint that at least one sub-row in each row of the input weight pattern is not pruned. In implementations, pruning a sub-column or sub-row corresponds to setting all elements in the sub-column or sub-row as zeros.

In implementations, upon obtaining the output weight pattern, the structured pruning system may further compress the output weight pattern by removing pruned sub-columns and sub-rows from the output weight pattern to produce a compressed weight pattern that facilitates parallel computations through pipelined hardware or multiple processing units such as ASIC (i.e., Application-Specific Integrated Circuit), a FPGA (i.e., Field-Programmable Gate Array), or other hardware.

In implementations, functions described herein to be performed by the structured pruning system may be performed by multiple separate units or services. For example, a receiving service may receive an input weight pattern, and a pruning service may apply a BRCP algorithm on the input weight pattern to produce an output weight pattern, while a compression service may compress the output weight pattern into a compact or dense weight pattern that is hardware friendly.

Moreover, although in the examples described herein, the structured pruning system may be implemented as software and/or hardware installed in a single device, in other examples, the structured pruning system may be implemented and distributed in multiple devices or as services provided in one or more servers over a network and/or in a cloud computing architecture.

The application describes multiple and varied implementations and embodiments. The following section describes an example framework that is suitable for practicing various implementations. Next, the application describes example systems, devices, and processes for implementing a structured pruning system.

Example Environment

FIG. 1 illustrates an example environment 100 usable to implement a structured pruning system. The environment 100 may include a structured pruning system 102. In this example, the structured pruning system 102 is described to exist as an individual entity. In some instances, the structured pruning system 102 may be included in a client device 104. Alternatively, the structured pruning system 102 may include one or more client devices. In other instances, the structured pruning system 102 may be included in a plurality of servers 106-1, 106-2, . . . , 106-N (which are collectively called servers 106) that communicate data with one another over a network 108. In some implementations, the plurality of servers 106 may exist as a cloud or data center.

In implementations, the client device 104 may be implemented as any of a variety of computing devices including, but not limited to, a desktop computer, a notebook or portable computer, a handheld device, a netbook, an Internet appliance, a tablet or slate computer, a mobile device (e.g., a mobile phone, a personal digital assistant, a smart phone, etc.), etc., or a combination thereof. The client device 104 may communicate data with the plurality of servers 106 via the network 108, and request services from the plurality of servers 106.

In implementations, the functions of the structured pruning system 102 may be provided by or included in the client device 104. In some instances, the functions of the structured pruning system 104 may be included in and/or distributed among the plurality of servers 106. For example, a first server of the plurality of servers 106 may include part of the functions of the structured pruning system 102, while other functions of the structured pruning system 104 may be included in a second server of the plurality of servers 106. Additionally or alternatively, the functions of the structured pruning system 102 may be included and distributed in the client device 104 and the plurality of servers 106. Furthermore, in some implementations, some or all the functions of the structured pruning system 102 may be included in a cloud computing system or architecture, and may be provided to the client device 104 as services, for example.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In implementations, the structured pruning system 104 may receive an instruction from a user of the client device 104 to convert an input weight pattern associated with a machine learning model (such as a neural network model) into an output weight pattern that occupies less memory space and requires fewer computational operations (such as multiplication and addition/accumulation operations) with an input of the neural network model to produce an output. In response to receiving the input weight pattern, the structured pruning system 104 may perform pruning and compression operations to obtain a weight pattern that is sparser and computationally less intensive from the input weight pattern, and return the obtained weight pattern to the client device 104 or store the obtained weight pattern in a designated location such as a storage device of a server of the one or more servers 106.

Example Structured Pruning System

Figure 2A:
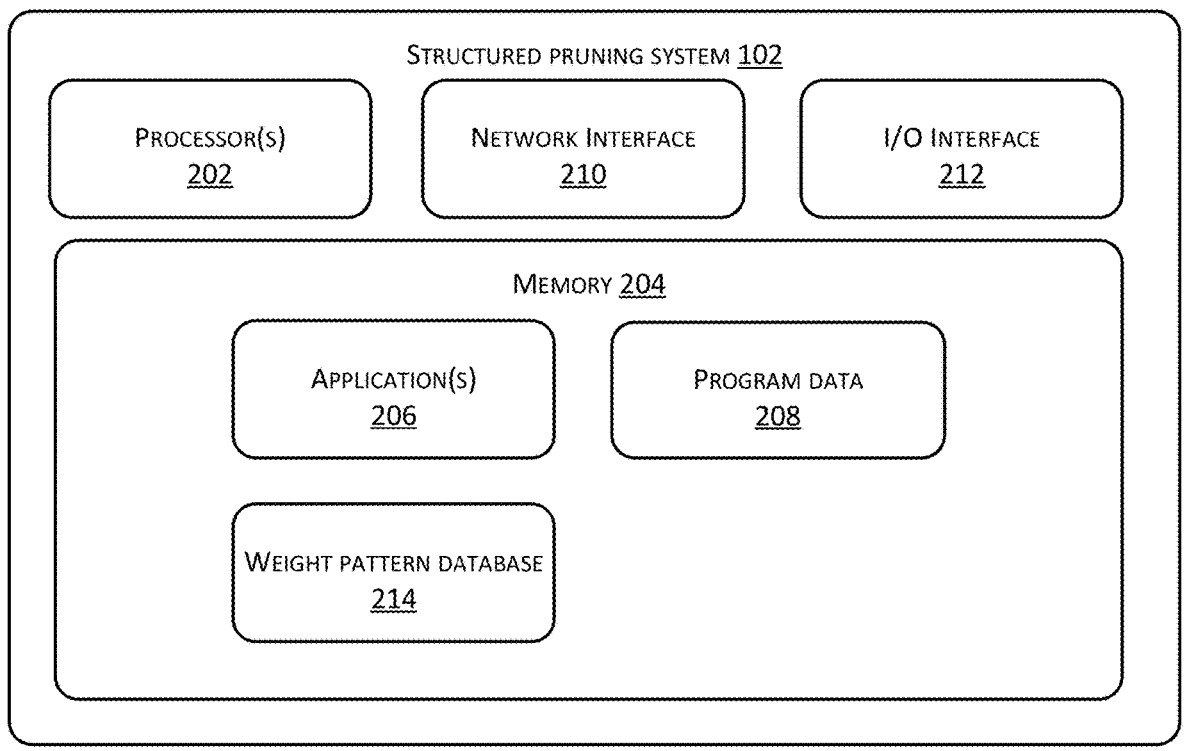
FIG. 2A illustrates the example structured pruning system in more detail.

FIG. 2A illustrates the structured pruning system 102 in more detail. In implementations, the structured pruning system 102 includes, but is not limited to, one or more processors 202, memory 204, one or more applications or services 206 (e.g., a pruning application or service, a compression application or service, etc.) and program data 208. In implementations, the structured pruning system 102 may further include a network interface 210 and an input/output interface (I/O) 212. The processor(s) 202 is configured to execute instructions received from the network interface 210, received from the input/output interface 212, and/or stored in the memory 204. Additionally or alternatively, some or all of the functionalities of the structured pruning system 102 may be implemented using an ASIC (i.e., Application-Specific Integrated Circuit), a FPGA (i.e., Field-Programmable Gate Array), or other hardware provided in the structured pruning system 102. In implementations, the one or more processors 202 may include, but are not limited to, a neural network processing unit (NPU), a graphic processing unit (GPU), a tensor processing unit (TPU), a microprocessor, an application-specific instruction-set processor, a physics processing unit (PPU), a digital signal processor, etc.

The memory 204 may include computer-readable media in a form of volatile memory, such as Random Access Memory (RAM) and/or non-volatile memory, such as read only memory (ROM) or flash RAM. The memory 204 is an example of computer-readable media.

The computer-readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the structured pruning system 102 may further include a weight pattern database 214 that is configured to store data of resulting weight patterns (e.g., data of output and/or compressed weight patterns) obtained after pruning and compression.

In implementations, the structured pruning system 102 may be implemented using a neural network processing architecture or a cloud system that includes a neural network processing architecture to further improve throughput and power efficiency. Additionally or alternatively, the structured pruning system 102 may also be implemented using any accelerator that is capable of performing parallel computations.

Figure 2B:
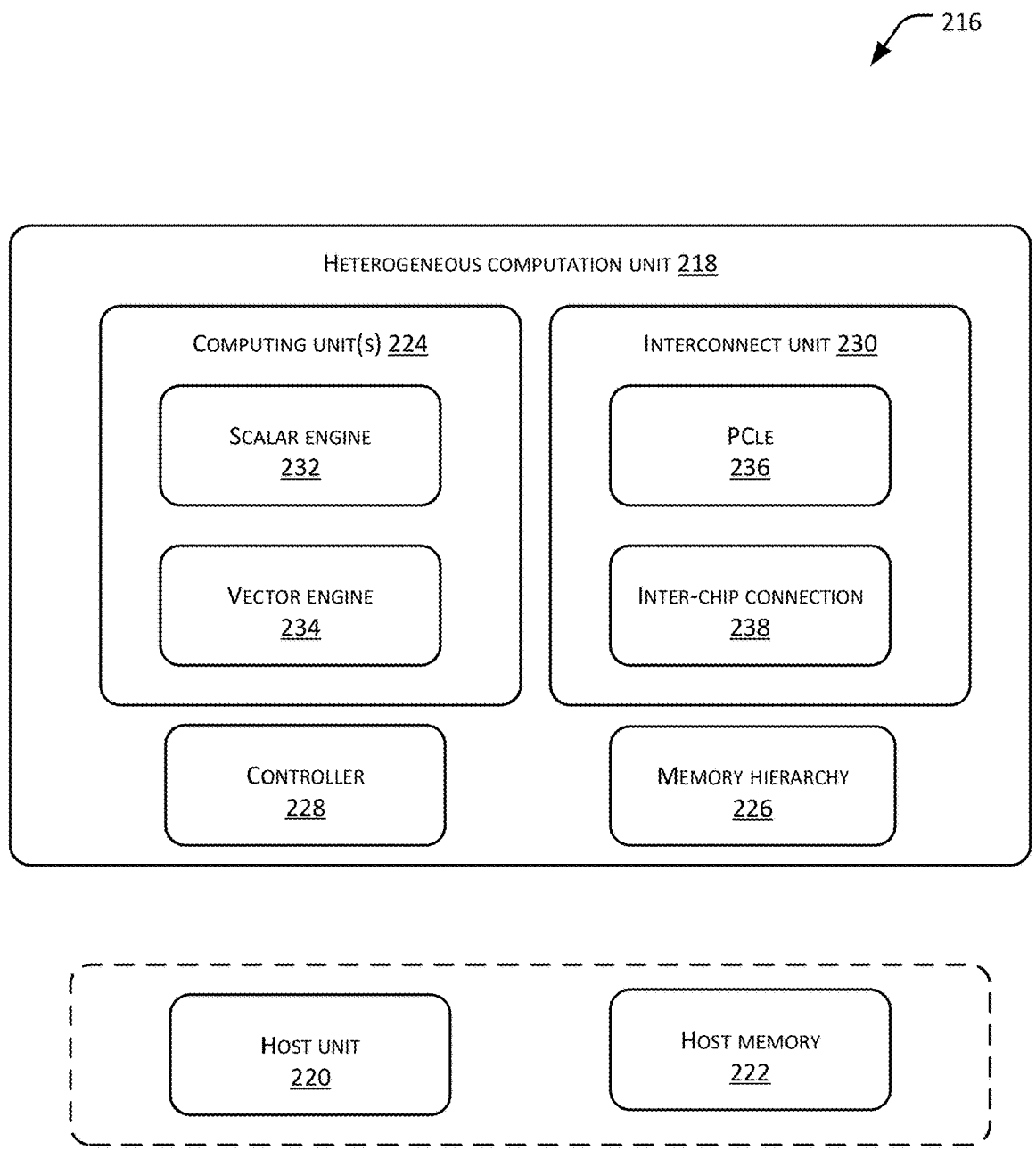
FIG. 2B illustrates an example neural network processing architecture that can be used for implementing the structured pruning system.

FIG. 2B illustrates an example neural network processing architecture 216 that can be used for implementing the structured pruning system 102. In implementations, the neural network processing architecture 216 may include a heterogeneous computation unit (HCU) 218, a host unit 220, and a host memory 222. The heterogeneous computation unit 218 may include a special-purpose computing device or hardware used for facilitating and performing neural network computing tasks. By way of example and not limitation, the heterogeneous computation unit 218 may perform algorithmic operations including operations associated with machine learning algorithms. In implementations, the heterogeneous computation unit 218 may be an accelerator, which may include, but is not limited to, a neural network processing unit (NPU), a graphic processing unit (GPU), a tensor processing unit (TPU), a microprocessor, an application-specific instruction-set processor, a physics processing unit (PPU), a digital signal processor, etc.

In implementations, the heterogeneous computation unit 218 may include one or more computing units 224, a memory hierarchy 226, a controller 228, and an interconnect unit 230. The computing unit 224 may access the memory hierarchy 226 to read and write data in the memory hierarchy 226, and may further perform operations, such as arithmetic operations (e.g., multiplication, addition, multiply-accumulate, etc.) on the data. In implementations, the computing unit 224 may further include a plurality of engines that are configured to perform various types of operations. By way of example and not limitation, the computing unit 224 may include a scalar engine 232 and a vector engine 234. The scalar engine 232 may perform scalar operations such as scalar product, convolution, etc. The vector engine 234 may perform vector operations such as vector addition, vector product, etc.

In implementations, the memory hierarchy 226 may include an on-chip memory (such as 4 blocks of 8 GB second generation of high bandwidth memory (HBM2)) to serve as a main memory. The memory hierarchy 226 may be configured to store data and executable instructions, and allow other components of the neural network processing architecture 216 (e.g., the heterogeneous computation unit (HCU) 218, and the host unit 220), the heterogeneous computation unit 218 (e.g., the computing units 224 and the interconnect unit 230), and/or a device external to the neural network processing architecture 216 to access the stored data and/or the stored instructions with high speed, for example.

In implementations, the interconnect unit 230 may provide or facilitate communications of data and/or instructions between the heterogeneous computation unit 218 and other devices or units (e.g., the host unit 220, one or more other HCU(s)) that are external to the heterogeneous computation unit 218. In implementations, the interconnect unit 230 may include a peripheral component interconnect express (PCIe) interface 236 and an inter-chip connection 238. The PCIe interface 236 may provide or facilitate communications of data and/or instructions between the heterogeneous computation unit 218 and the host unit 220. The inter-chip connection 238 may serve as an inter-chip bus to connect the heterogeneous computation unit 218 with other devices, such as other HCUs, an off-chip memory, and/or peripheral devices.

In implementations, the controller 228 may be configured to control and coordinate operations of other components included in the heterogeneous computation unit 218. For example, the controller 228 may control and coordinate different components in the heterogeneous computation unit 218 (such as the scalar engine 232, the vector engine 234, and/or the interconnect unit 230) to facilitate parallelism or synchronization among these components.

In implementations, the host memory 222 may be an off-chip memory such as a memory of one or more processing units of a host system or device that includes the neural network processing architecture 216. In implementations, the host memory 222 may include a DDR memory (e.g., DDR SDRAM) or the like, and may be configured to store a large amount of data with slower access speed, as compared to an on-chip memory that is integrated within the one or more processing units, to act as a higher-level cache.

In implementations, the host unit 220 may include one or more processing units (e.g., an X86 central processing unit (CPU)). In implementations, the host system or device having the host unit 220 and the host memory 222 may further include a compiler (not shown). The compiler may be a program or computer software configured to convert computer codes written in a certain programming language into instructions that are readable and executable by the heterogeneous computation unit 218. In machine learning applications, the compiler may perform a variety of operations, which may include, but are not limited to, pre-processing, lexical analysis, parsing, semantic analysis, conversion of an input program to an intermediate representation, code optimization, and code generation, or any combination thereof.

Figure 2C:
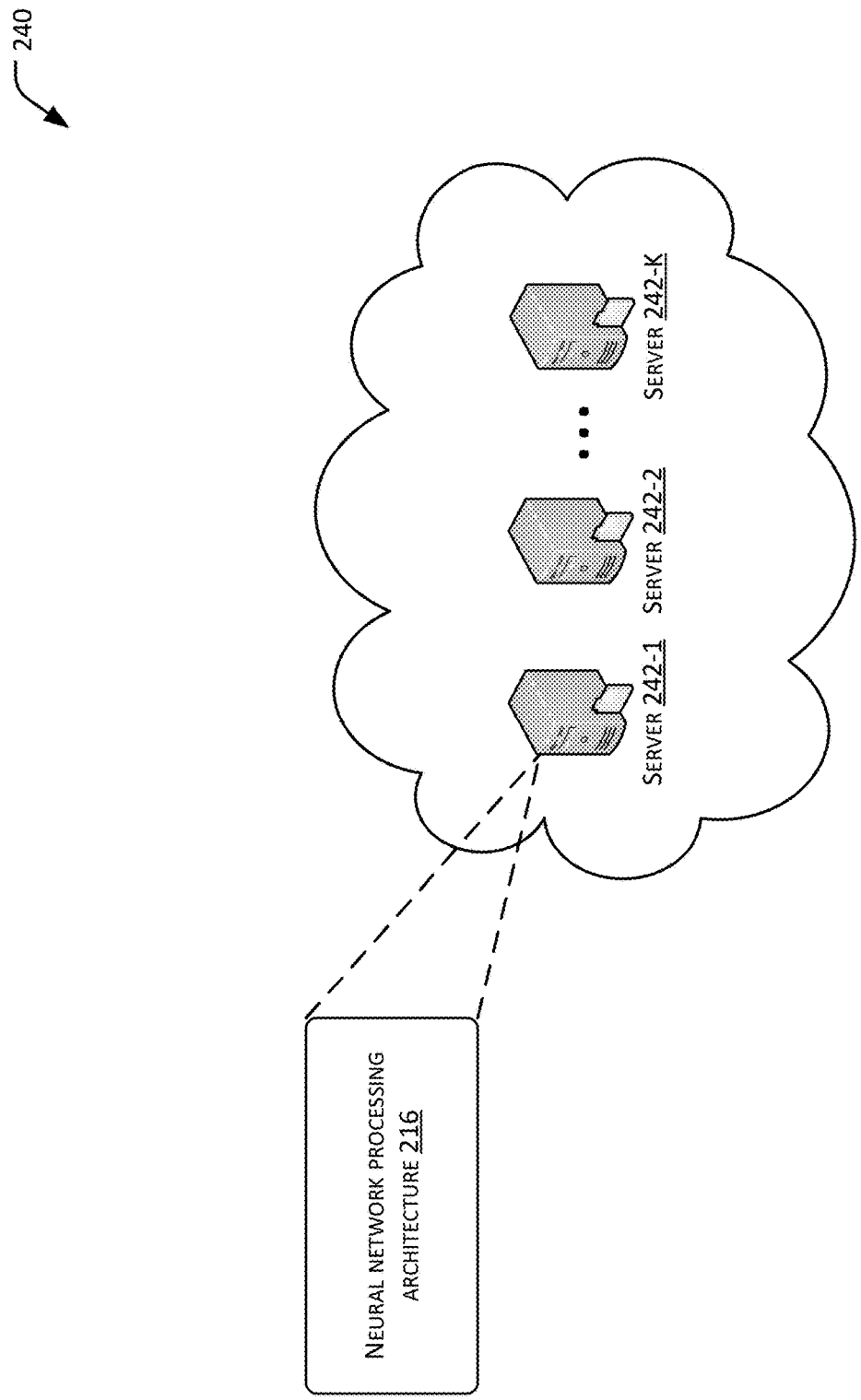
FIG. 2C illustrates an example cloud system that incorporates the example neural network processing architecture to implement the example structured pruning system.

FIG. 2C illustrates an example cloud system 240 that incorporates the neural network processing architecture 216 to implement the structured pruning system 102. The cloud system 240 may provide cloud services with machine learning and artificial intelligence (AI) capabilities, and may include a plurality of servers, e.g., servers 242-1, 242-2, and 242-K (which are collectively called as servers 242), where K is a positive integer. In implementations, one or more of the servers 242 may include the neural network processing architecture 216. Using the neural network processing architecture 216, the cloud system 240 may provide part or all of the functionalities of the structured pruning system 102, and other machine learning and artificial intelligence capabilities such as image recognition, facial recognition, translations, 3D modeling, etc.

In implementations, although the cloud system 240 is described above, in some instances, the neural network processing architecture 216 that provides some or all of the functionalities of the structured pruning system 102 may be deployed in other types of computing devices, which may include, but not limited to, a mobile device, a tablet computer, a wearable device, a desktop computer, etc.

Example Method

Figure 3:
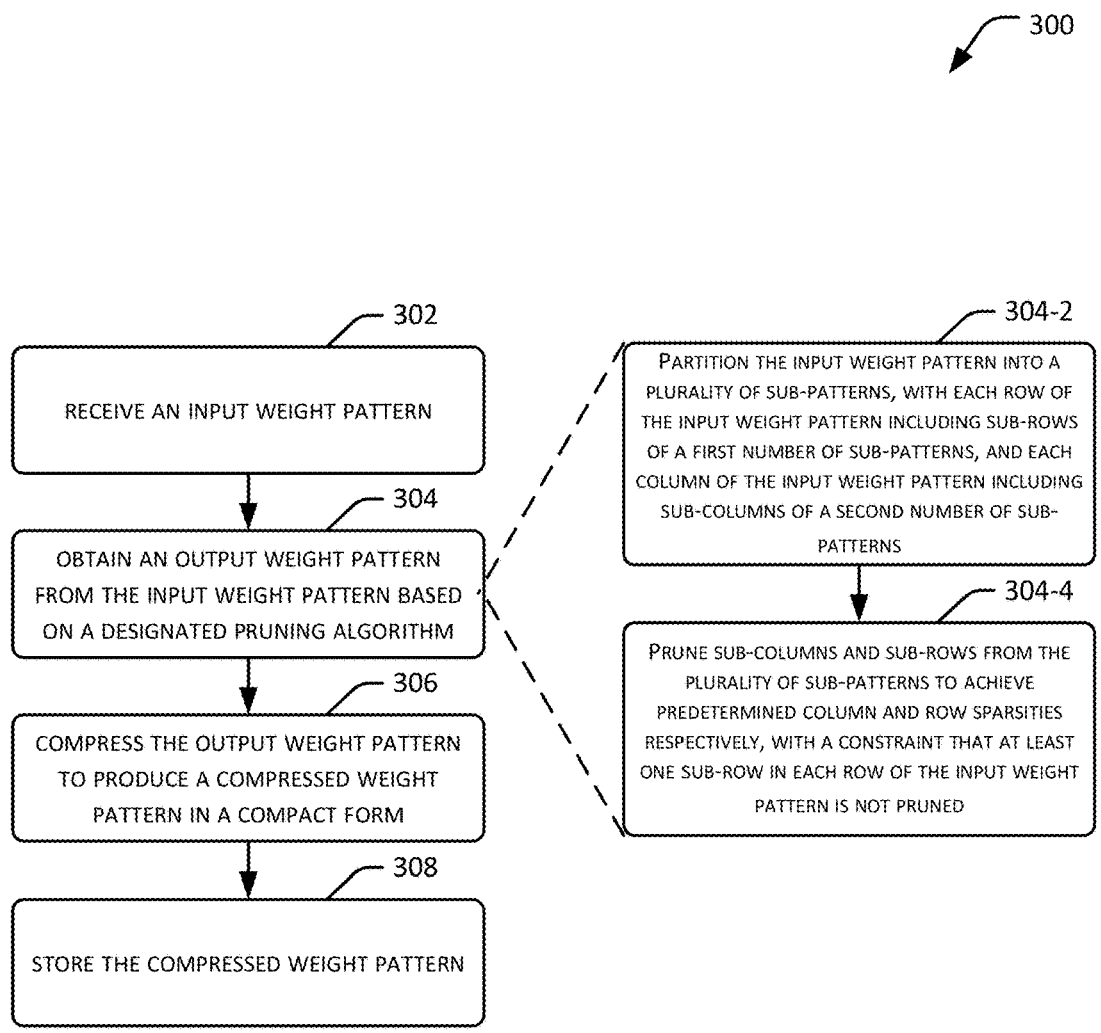
FIG. 3 illustrates an example structured pruning method.

FIG. 3 is a schematic diagram depicting a structured pruning method. The method of FIG. 3 may, but need not, be implemented in the environment of FIG. 1 and using the system of FIG. 2. For ease of explanation, method 300 described with reference to FIGS. 1 and 2. However, the method 300 may alternatively be implemented in other environments and/or using other systems.

Method 300 is described in the general context of computer-executable instructions. Generally, computer-executable instructions can include routines, programs, objects, components, data structures, procedures, modules, functions, and the like that perform particular functions or implement particular abstract data types. Furthermore, the example method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the structured pruning system 102 may receive an input weight pattern.

In implementations, the structured pruning system 102 may receive data of an input weight pattern from the client device 104. The input weight pattern may be a weight pattern that is obtained after training a machine learning model through a training algorithm using a set of training samples. In implementations, the machine learning model may include a learning model having a weight pattern, such as a neural network model. Without loss of generality and for the sake of description, a neural network model is used hereinafter as an example of the machine learning model. The following description may also be applicable to any other machine learning models including a weight pattern of which some elements can be pruned to achieve the purpose of structured pruning described in this disclosure.

In implementations, the input weight pattern may be a data structure storing weight information of a certain layer of the neural network model. Alternatively, the input weight pattern may be one or more data structures, with each data structure storing weight information of a corresponding layer of a plurality of layers of the neural network model.

In implementations, a data structure storing weight information of a layer of the neural network model may include, for example, a N×M matrix, wherein N and M are positive integers greater than one, a plurality of arrays with at least one array storing nonzero weight values and another array storing corresponding indices of these nonzero weight values, etc. In this example, the input weight pattern is described to be a data structure in matrix format that is associated with a certain layer of the neural network model for illustration, and processing on data structures of other layers of the neural network model can be performed in a similar way. Furthermore, in an event that the data structure is not in a matrix format, appropriate conversion may be applied to convert the data structure into a matrix format.

At block 304, the structured pruning system 102 may obtain an output weight pattern from the input weight pattern based on a designated pruning algorithm.

In implementations, the structured pruning system 102 may prune the input weight pattern to obtain an output weight pattern by applying a designated pruning algorithm. In implementations, the designated pruning algorithm may include a block-wise row and column pruning (BRCP) algorithm.

By way of example and not limitation, the BRCP algorithm may include partitioning the input weight pattern into a plurality of sub-patterns, with each row of the input weight pattern including sub-rows of a first number of sub-patterns, and each column of the input weight pattern including sub-columns of a second number of sub-patterns at block 304-2. The BRCP algorithm may further include pruning sub-columns and sub-rows from the plurality of sub-patterns to achieve predetermined column and row sparsities respectively, with a constraint that at least one sub-row in each row of the input weight pattern is not pruned at block 304-4. Further details of the BRCP algorithm will be described in a later section.

In implementations, the structured pruning system 102 may divide the input weight pattern into a plurality of sub-patterns. By way of example and not limitation, the structured pruning system 102 may divide the input weight pattern (for example, a N×M weight matrix) into K number of banks, with each bank being divided into L number of blocks (i.e., sub-patterns), wherein N, M, K, and L are integer greater than one, N is greater than L, and M is greater than K. In other words, each row of the input weight pattern is divided into (and includes) K number of sub-rows, with each sub-row coming from a respective one of the K number of corresponding sub-patterns. Similarly, each column of the input weight pattern is divided into (and includes) L number of sub-columns, with each sub-column coming from a respective one of the L number of corresponding sub-patterns. Further details of such partitioning can be found in a later section.

In implementations, pruning a sub-column (or sub-row) may include setting elements in the sub-column (or sub-row) to be zeros. In implementations, a norm of a vector (such as a sub-column or a sub-row) may correspond to a square root of a sum of each element of the vector being squared. In implementations, a sparsity of data (e.g., in a form of a matrix) is a measure of zeros in the data (i.e., a measure of percentage of elements having zero values in the matrix). A high sparsity of data corresponds to a large percentage of elements in the data being zeros in value. For example, a 90% sparsity of data in a certain structure (such as a matrix, a column, or a row, etc.) means that 90% of elements in the data (i.e., elements in the structure such as matrix, column or row, etc.) are zeros in value.

In implementations, pruning the sub-columns from the plurality of sub-patterns to achieve the predetermined column sparsity may include pruning a sub-column of a sub-pattern in response to determining that a norm of the sub-column of the sub-pattern is less than a predetermined sub-column threshold.

In implementations, pruning the sub-rows from the plurality of sub-patterns to achieve the predetermined row sparsity with a constraint that at least one sub-row in each row of the input weight pattern is not pruned may include pruning a sub-row of a sub-pattern in response to determining that a norm of the sub-row of the sub-pattern is less than a predetermined sub-row threshold.

Additionally or alternatively, pruning the sub-rows from the plurality of sub-patterns to achieve the predetermined row sparsity with a constraint that at least one sub-row in each row of the input weight pattern is not pruned may include determining that respective norms of all sub-rows in a certain row of the input weight pattern are less than the predetermined sub-row threshold; and keeping at least one sub-row having a norm that is highest among the respective norms of all the sub-rows in the certain row of the input weight pattern, and pruning remaining sub-rows in the certain sub-row of the input weight pattern.

In implementations, the sub-column threshold and the sub-row threshold may be determined based on the predetermined column sparsity and the predetermined row sparsity respectively. By way of example and not limitation, respective norms of sub-columns and sub-rows of the plurality of sub-patterns in the input weight pattern may be calculated, and cut-off values for norms of sub-columns and sub-rows that can achieve the predetermined column sparsity and the predetermined row sparsity may be determined, and set as the sub-column threshold and the sub-row threshold respectively.

In implementations, if the structured pruning system 102 has an access to the neural network model associated with the input weight pattern, the structured pruning system 102 may further determine an accuracy of the neural network model with the output weight pattern. Specifically, as described above, the input weight pattern may be a weight pattern that is obtained after training a neural network model through a training algorithm using a set of training samples, and an accuracy of the neural network model with the input weight pattern may be determined using a set of testing samples. In implementations, after obtaining the output weight pattern from the input weight pattern using the designated pruning algorithm (e.g., the BRCP algorithm), the structured pruning system 102 may further determine an accuracy of the neural network model with the output weight pattern using the same set of testing samples, and compare this determined accuracy of the neural network model with the output weight pattern with the accuracy of the neural network model with the input weight pattern.

If the accuracy of the neural network model with the output weight pattern is not less than the accuracy of the neural network model with the input weight pattern by a predetermined percentage (e.g., 1%, 2%, 3%, etc.), the structured pruning system 102 may accept the output weight pattern. Otherwise, the structured pruning system 102 may automatically reduce the column sparsity and/or the row sparsity, and reapply the BRCP algorithm on the input weight pattern to produce a new output weight pattern until the neural network with new output weight pattern has an accuracy that is not less than the accuracy of the neural network model with the input weight pattern by the predetermined percentage.

Alternatively, the structured pruning system 102 may notify a user of the client device 104 that the accuracy of the neural network model with the output weight pattern is reduced by more than the predetermined percentage, and wait for an instruction from the user whether such reduction in the accuracy is acceptable or the structured pruning system 102 is needed to perform the pruning algorithm again using different column sparsity and/or row sparsity.

At block 306, the structured pruning system 102 may compress the output weight pattern to produce a compressed weight pattern in a compact form.

In implementations, the structured pruning system 102 may compress the output weight pattern to produce a compressed weight pattern in a compact form by removing sub-columns and sub-rows having values of elements therein being all zeros from the output weight pattern.

At block 308, the structured pruning system 102 may store the compressed weight pattern.

In implementations, the structured pruning system 102 may store the compressed weight pattern in the memory 204, such as the weight pattern database 210, or transmit the compressed weight pattern to the client device 104 or one of the one or more servers 106 for storage.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media.

Example Structured Pruning Algorithm

As described in the foregoing description, the structured pruning system 102 may apply a designated pruning algorithm called a column-wise row and column pruning (BRCP) algorithm on an input weight pattern to produce an output weight pattern. In order to further understand the BRCP algorithm, the algorithm is described hereinafter in more detail from three perspectives: (1) an algorithmic prototype aiming at achieving a high overall storage or memory reduction for weight and indices, and efficient decoding; (2) an algorithmic hardware co-design through an analysis of the characteristics of the algorithm and one or more constraints that a hardware design may encounter; and (3) a hardware-aware algorithmic design using the characteristics of the algorithm and the one or more constraints as a guideline.

In implementations, pruning an entire column in a weight pattern (e.g., a weight matrix) of a layer of neural network is equivalent to removing a corresponding input activation. On the other hand, pruning an entire row in the weight pattern is equivalent to removing a corresponding output activation. Specifically, these two types of pruning can only achieve a limited pruning ratio due to a loss of activation information. On the contrary, retaining the activation information can facilitate achieving a high pruning ratio.

In implementations, the BRCP algorithm is configured to avoid an entire column and/or an entire row from being removed, thus facilitating an achievement of a high pruning ratio by avoiding a loss of activation information.

Figure 4:
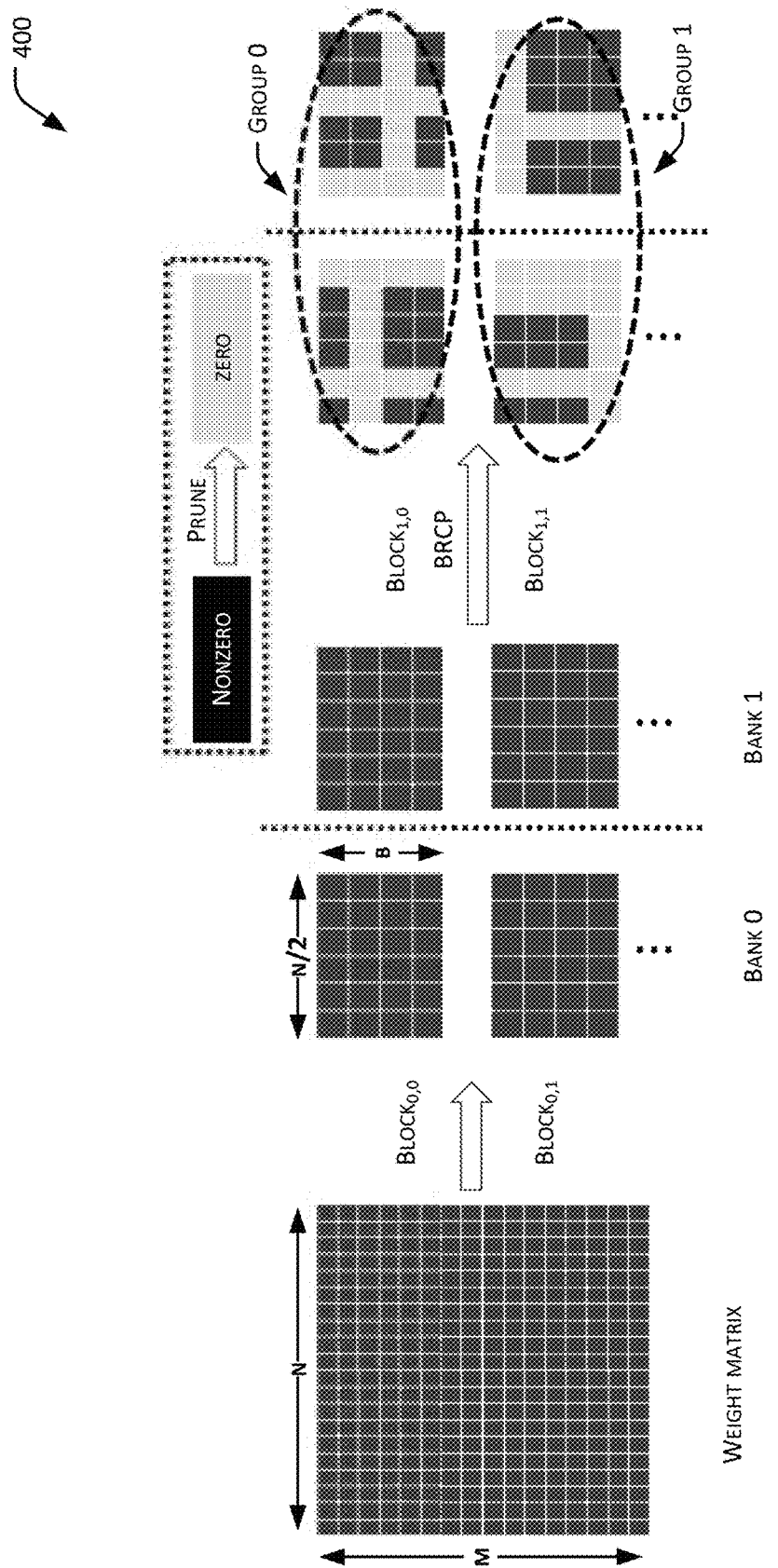
FIG. 4 illustrates an example block-wise row and column pruning (BRCP) algorithm.

Table 1 shows an example of the BRCP algorithm in detail. FIG. 4 illustrates an example block-wise row and column pruning (BRCP) algorithm 400. According to Table 1 and FIG. 4, the BRCP algorithm may first split a weight pattern (a weight matrix $W \in R^{m \times n}$ in this example) into a plurality of banks (in this example, two banks, namely, $W_0 \in R^{m \times n1}$ and $W_1 \in R^{m \times n2}$, where m is the number of rows, n is the number of columns, and $$n1 = n2 = \frac{n}{2}).$$

Although, in this example, the weight pattern is said to be divided into two banks, in other instances, the weight pattern may be divided into more than two banks, such as three banks, four banks, etc. In implementations, the number of banks that are divided from a weight pattern may depend on a size of the weight pattern, a degree of granularity for exploring sparsity, the number of processing units that are available for processing the banks in parallel, or any other criteria set by an administrator of the structured pruning system 102.

TABLE 1

BRCP Algorithm

| | |
|---|---|
| Input: | $W^l \in R^{m \times n}$ is a weight pattern (or matrix) at the $l^{th}$ layer of a neural network model; $p_c$ and $p_r$ are target column and row sparsities (in percentage); and b is a target block size |
| Output: | $Z^l$ is a pruning mask for $W^l$ and includes zeros and ones to indicate which weights (i.e., elements in $W^l$) are to be pruned or retained |
| Process: | |
| 1. | Divide $W^l$ into two banks $W_{:,0}{}^l$ and $W_{:,1}{}^l$ |
| 2. | for bank j = 0, 1 do |
| 3. | Divide a bank into blocks $W_{i,j}^l \in R^{b \times \frac{n}{2}}$, where $i = \left[0, 1, \ldots, \left(\left\lfloor \frac{m}{b} \right\rfloor - 1\right)\right]$; |
| 4. | for block $i = \left[0, 1, \ldots, \left(\left\lfloor \frac{m}{b} \right\rfloor - 1\right)\right]$ do |
| 5. | Compute $L_2$ norm of each sub-column in $W_{i,j}^l$; |
| 6. | Find a threshold v* such that sub-columns whose $L_2$ is less than v* are pruned to achieve the column sparsity $p_c$; |
| 7. | for sub-column $k = 0, 1, \ldots, \left(\frac{n}{2} - 1\right)$ do |
| 8. | $Z_{i,j}^l[:, k] = 0$ if $L_2(W_{i,j}^l[:, k]) < v*$; |
| 9. | end |
| 10. | end |
| 11. | Compute $L_2$ norm of each sub-row and find a pruning threshold u* are pruned to achieve the column sparsity $p_r$; |
| 12. | for row r = 0, 1, . . . , m-1 do |
| 13. | $Z_{r,j}^l[r, :] = 0$ if $L_2(W_{r,j}^l[r, :]) < u*$; |
| 14. | end |
| 15. | if m is not divisible by b then |
| 16. | Form remained rows into a block, and perform block-wise column pruning |
| 17. | end |
| 18. | end |
| 19. | for row r = 0, 1, . . . , m-1 do |
| 20. | if row r is wholly pruned then |
| 21. | Restore the half-row whose $L_2$ norm is larger; |
| 22. | end |
| 23. | end |

In implementations, after dividing the weight pattern into a plurality of banks (e.g., two banks in this example), the BRCP algorithm may then divide each bank into blocks (i.e., sub-patterns)

$$W_{i,j} \in R^{b \times \frac{n}{2}},$$

where b is the number of rows (i.e., sub-rows) in each block (i.e., sub-patterns), $$i \in \left[0, 1, \ldots, \left(\left\lfloor \frac{m}{b} \right\rfloor - 1\right)\right],$$

and $j \in [0, 1]$. In implementations, column pruning may be performed separately within each block rather than the entire weight pattern (i.e., the entire weight matrix W). Since the weight pattern is divided into two banks in this example, each row of the weight pattern is also divided into two half-rows (i.e., two sub-rows). In implementations, however, each row of the weight pattern may be divided into more than two sub-rows if the weight pattern is divided into more than two banks. Two banks are used for illustration only, and the algorithm described hereinafter can be expanded and applied when the weight pattern is divided into more than two banks.

After the column pruning is performed, row pruning may be performed over the entire weight pattern (i.e., the entire weight matrix W), with a (bank-exclusive) constraint: for any row in the weight pattern, at most one of the two half-rows is allowed to be pruned, or in other words, at least one of the two half-rows is not pruned. This constraint avoids any row in the weight pattern from being entirely pruned, and thus avoids a removal of a corresponding output activation. In implementations, if each row of the weight pattern may be divided into more than two sub-rows, the constraint may include at least one sub-row in any row of the weight pattern not being pruned.

Figure 5:
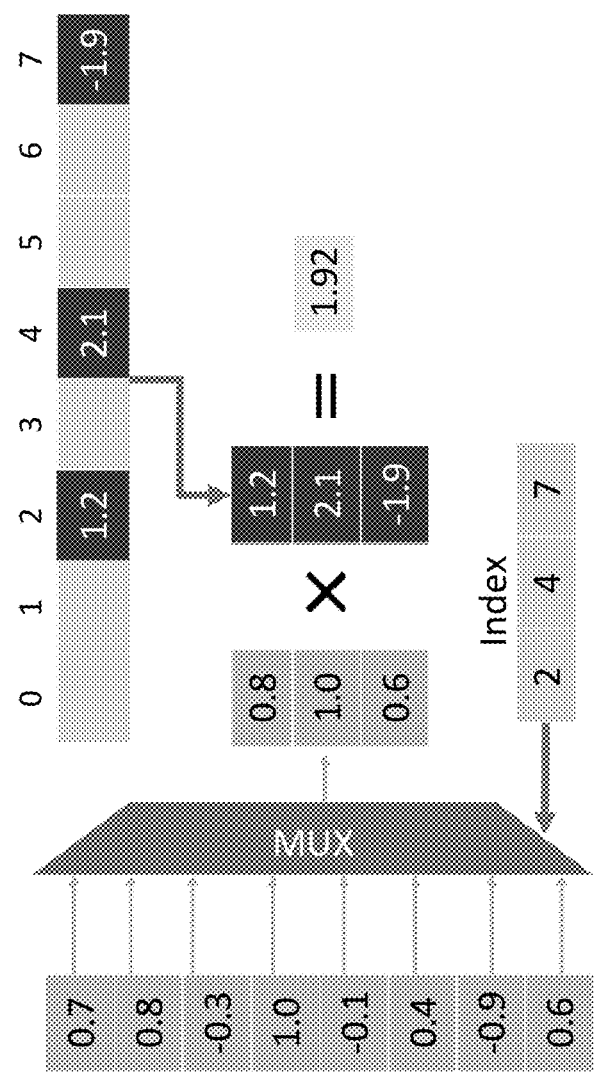
FIG. 5 illustrates an example process of decoding.

In implementations, in order to enable the output weight pattern (i.e., the neural network model with the output weight pattern) hardware friendly to obtain a high speed-up, an algorithmic hardware co-design method may be used so that any optimization on the pruning algorithm can be hardware-aware. In implementations, for a pruned matrix such as the output weight pattern, knowing coordinates of activations that are associated with retained weights (i.e., elements in the output weight pattern that are retained and not pruned due to the pruning algorithm, such as the BRCP algorithm) is important. Accordingly, decoding is needed to select activations that are associated with the retained weights from an input to the neural network layer associated with the output weight pattern (i.e., an input vector) during computations. FIG. 5 shows an example process 500 of decoding. In FIG. 5, each retained weight may have an index for decoding. If irregular or random pruning is performed, such index may be arbitrary and random, and so a search over the entire input vector is needed. Given that the bandwidth of decoding may be limited, decoding usually fails to be accelerated for irregular or random pruning. Accordingly, increasing the number of weights (or elements in the weight pattern) shared by a common index can help to improve or speed up the performance of computations associated with the weight pattern.

In implementations, the value of b (the number of sub-rows in a sub-pattern) in the BRCP algorithm is a factor that determines the number of weights (i.e., elements in the weight pattern) shared by a common index. Therefore, the larger a value of b is, the fewer the number of indices is, and the faster the decoding can be. In implementations, given a sparsity of a block (i.e., a sub-pattern) is p, the time spent for decoding a half-row of the weight pattern in this example is $$\frac{n \cdot p}{2},$$

which is also the time spent for decoding the entire block. Accordingly, an average latency of decoding the block is $$\frac{n \cdot p}{b \cdot 2}.$$

In implementations, if enough hardware resources are available, multiple blocks of the two banks can be decoded in parallel to improve an overall throughput. If g denotes the number of groups that are decoded in parallel, an average time spent for decoding each row of the weight pattern may be formulated as Equation (1) as follows:

$$\frac{n \cdot p}{2 \cdot b \cdot g} \quad (1)$$

In implementations, in order to improve the utilization of hardware resources, decoders and process engines (PEs) may operate at the same pace without waiting for each other. For example, if s denotes the number of PEs that are available, the time spent for computing a group satisfies constraints as defined in Equations (2) and (3) as follows:

$$\frac{n \cdot p}{2 \cdot s} \cdot b = \frac{n \cdot p}{2} \quad (2)$$

which can be simplified as:

$$s = b \quad (3)$$

Based on the above analysis, the BRCP algorithm can improve a pruning ratio and performance at the same time. In implementations, for hardware design, s may be set to be equal to b to assure the utilization of decoders and PEs. Furthermore, in implementations, g may be set to be large enough to improve parallelism of decoding and computation as long as hardware resources are available or the costs for the hardware resources are acceptable, for example.

In implementations, for algorithmic design, Equation (2) suggests that increasing $$\frac{b}{p}$$

can help to improve the performance of decoding. Accordingly, b may be determined based on an optimal value of $$\frac{b}{p},$$

which may also be subject to an on-chip memory budget. In implementations, given that the overall sparsity p includes the column sparsity $p_c$ and the row sparsity $p_r$, a plurality of constraints may further be imposed on the column sparsity $p_c$ to allow the hardware design to be friendly. By way of example and not limitation, the plurality of constraints may include: (1) all blocks (i.e., sub-patterns) to have the same $p_c$ to reduce the complexity of decoding; and (2) $n \cdot p_c$ to be a multiple of s so that PEs may run at full speed. This can be achieved by trading off or changing the row sparsity $p_r$ accordingly.

Figure 6:
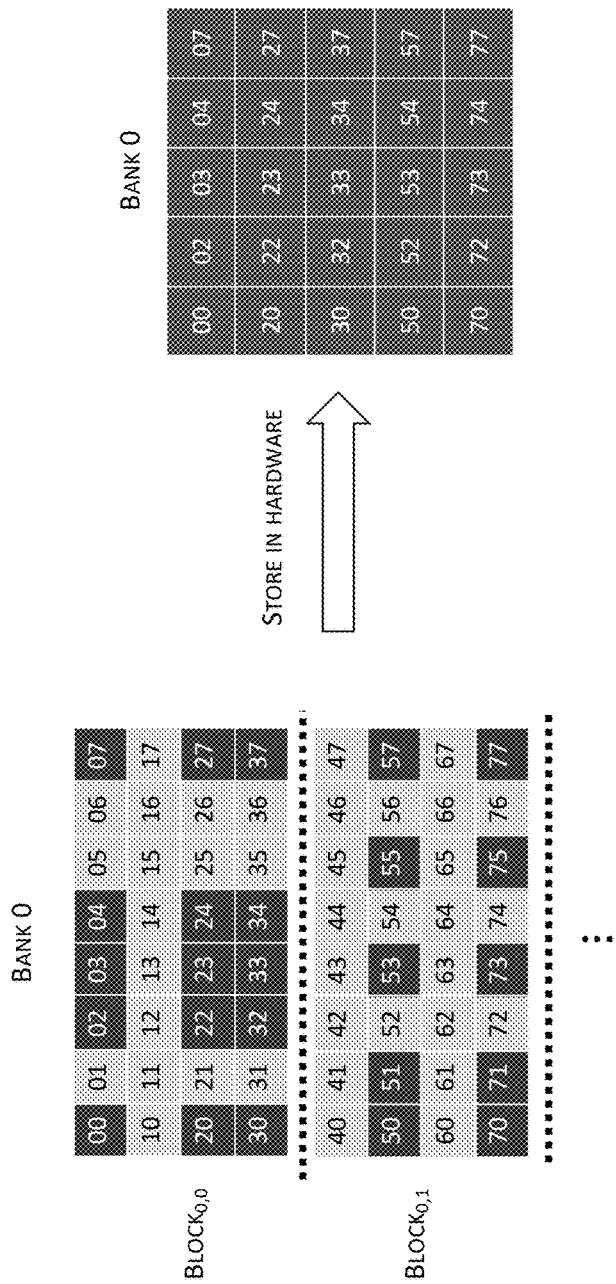
FIG. 6 illustrates an example conversion from an output weight pattern obtained by the BRCP algorithm into a compressed weight pattern in a compact form.

In implementations, the block-wise column pruning and bank-exclusive row pruning enable the BRCP algorithm to achieve a higher pruning ratio for an output weight pattern without an accuracy loss as compared to an input weight pattern, while significantly reducing the complexity of indexing and decoding. Furthermore, the BRCP algorithm performs restoration and computations of a weight pattern or matrix (i.e., an output weight pattern or matrix) without the need of converting the weight pattern into a frequency domain, and thus a reduction in storage or memory caused by the BRCP algorithm can lead to a reduction in computations completely. Moreover, by constraining each block (i.e., each sub-pattern) to have the same column sparsity $p_c$ and dividing blocks (i.e., sub-patterns) in a row direction, the BRCP algorithm is hardware-friendly, and can achieve a superior speedup. In implementations, the output weight pattern, which is a sparse weight pattern, can be compressed into a compact form with relative positions of retained elements (i.e., weights). For example, FIG. 6 shows an example conversion or compression 600 from an output weight pattern into a compressed weight pattern.

Example Hardware Architecture Design

Figure 7A:
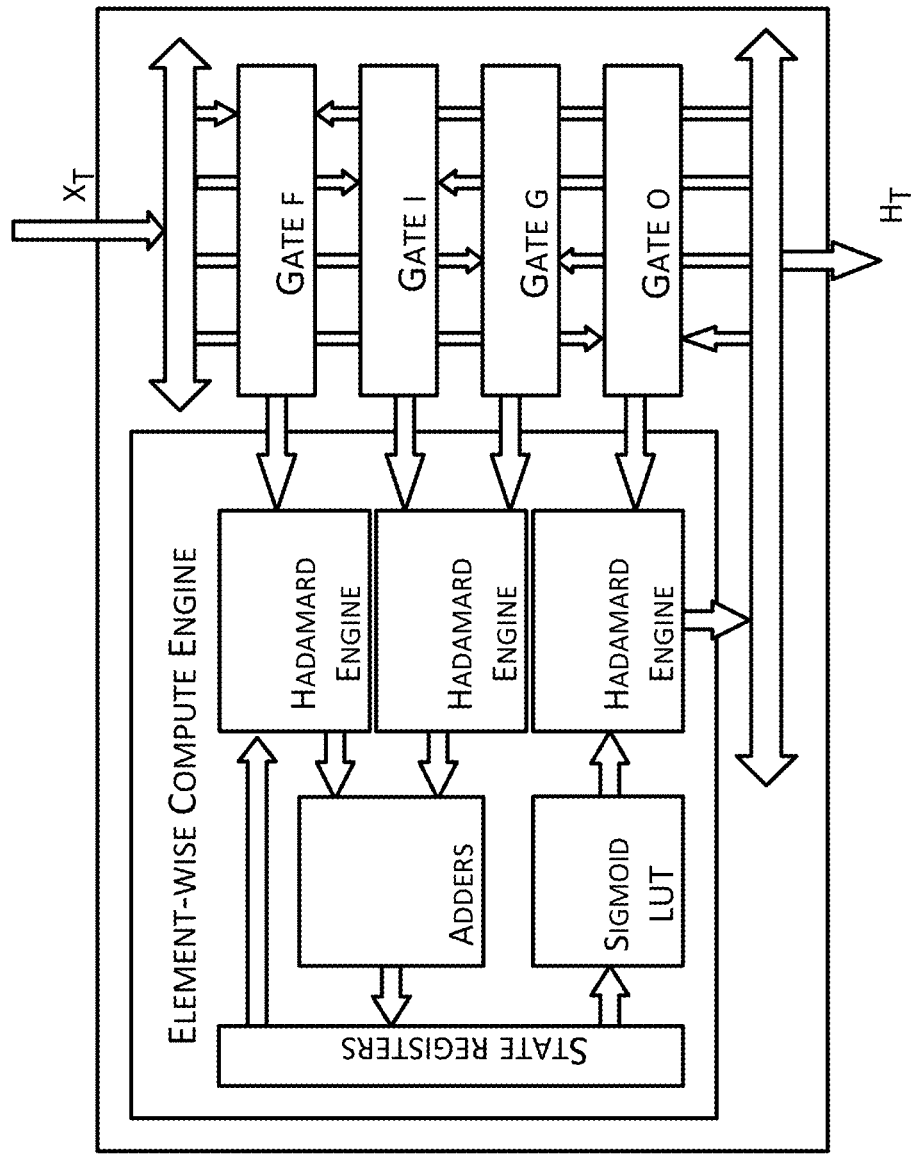
FIGS. 7A, 7B, and 7C illustrate an example hierarchical hardware design for the BRCP algorithm.
Figure 7B:
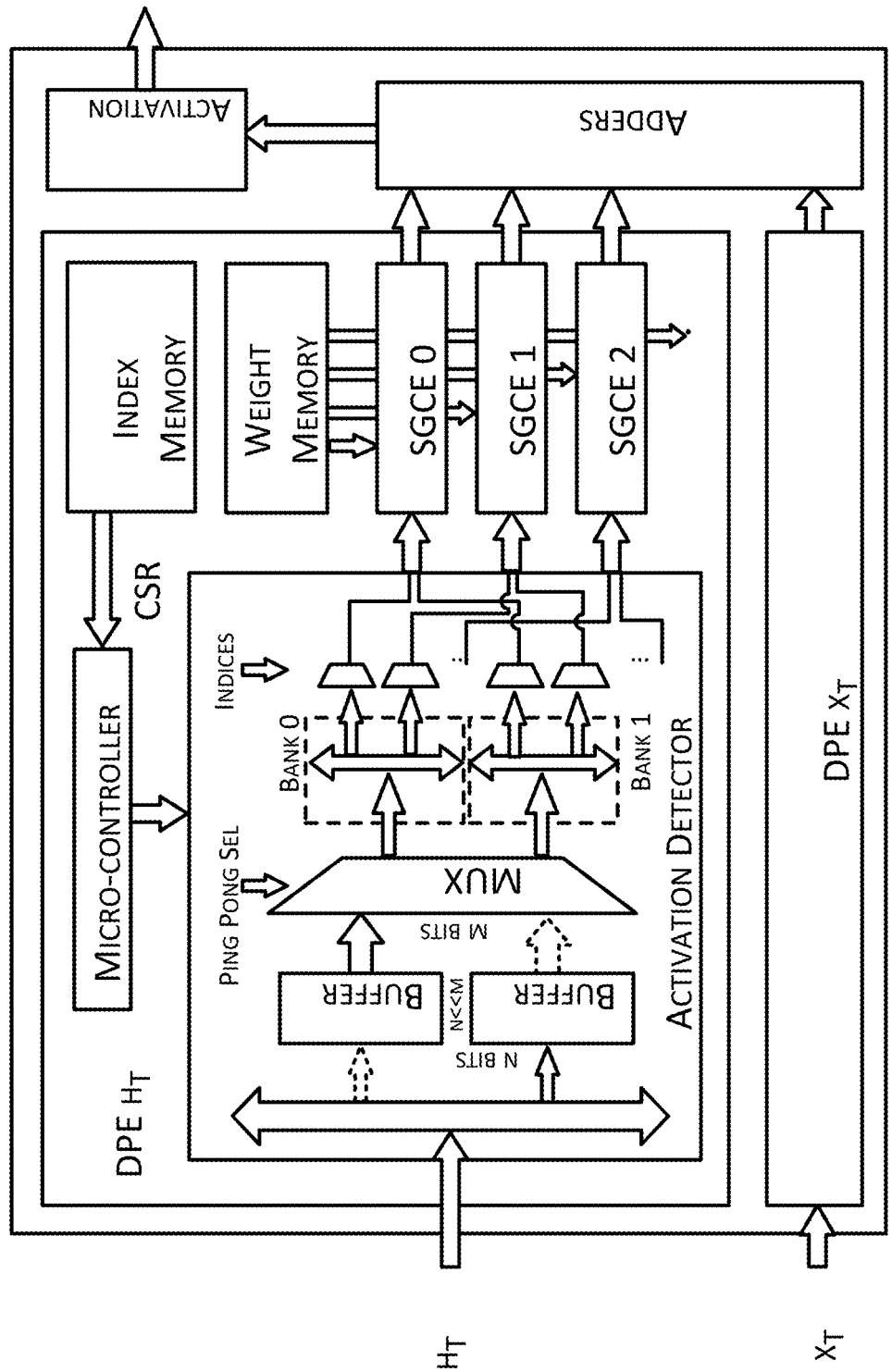
Figure 7C:
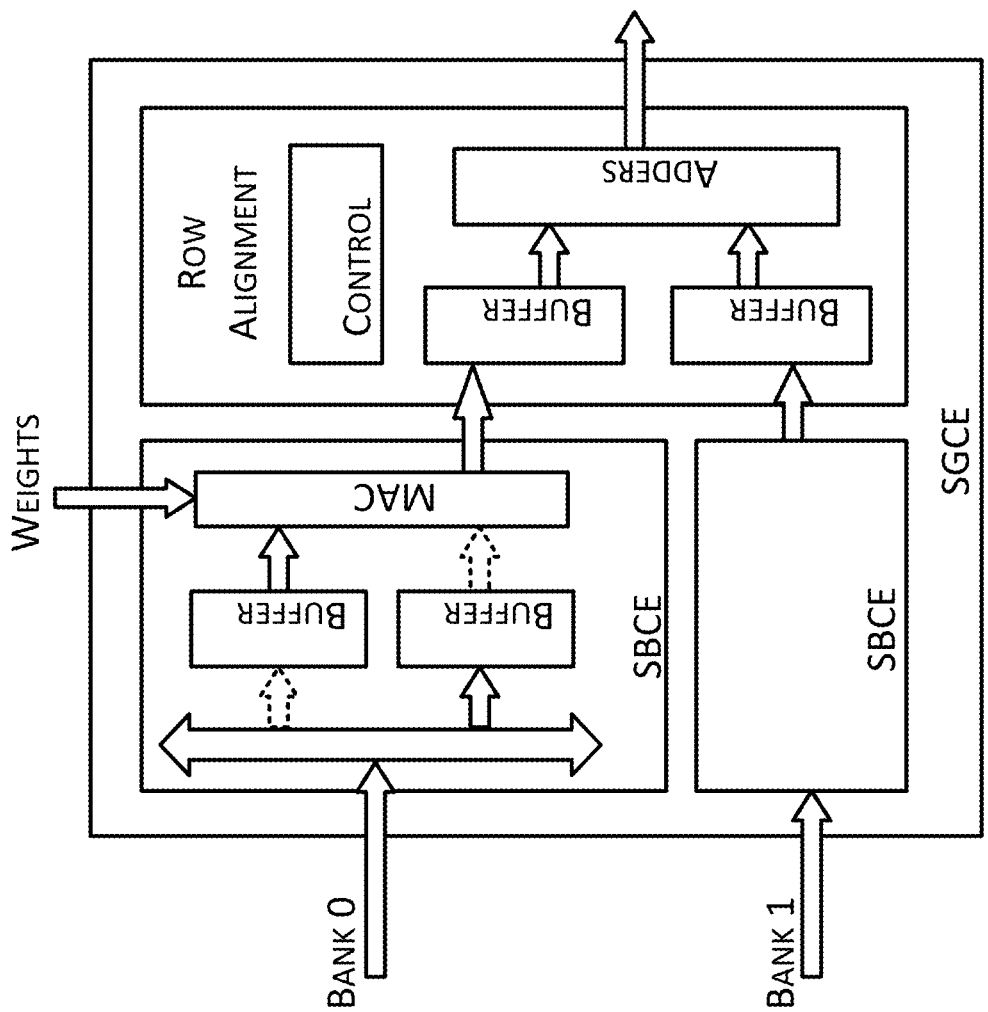

FIGS. 7A, 7B, and 7C show an example hierarchical hardware design that supports the BRCP algorithm. FIG. 7A shows an example hardware design of a Long Short Term Memory (LSTM) layer. FIG. 7B shows an example hardware design of a Gate. FIG. 7C shows an example hardware design of a Sparse Group Compute Engine (SGCE). Although in this example, Long Short Term Memory (LSTM) is used for illustration, the described BRCP algorithmic and hardware design may also be applied to other types of neural network model. The top-level blocking block is a Gate of a LSTM layer. By way of example and not limitation, the Gate may include a plurality of functional gates, such as a cell gate, a forget gate, an input gate, and an output gate, as shown in FIG. 7A. In implementations, a functional gate may include two Dot Product Engines (DPEs) and an activation function unit, and is responsible for performing a computation $f(xW_x + hW_h + bias)$, where $f(.)$ represents a function, which may be a sigmoid or tan h function, for example.

In implementations, multiple weight blocks (i.e., weight sub-patterns) may be processed in parallel to improve the computational throughput. In this example, each DPE may be built with multiple Sparse Group Compute Engines (SGCEs) that are used for processing one group of blocks, such as one block from Bank 0 and the other block from Bank 1 as shown in FIG. 7B. Although two blocks in a group are described in this example, a group may include more than two blocks, and a SGCE may be used for processing a group of more than two blocks accordingly.

In implementations, a SGCE may include a plurality of Sparse Block Compute Engines (SBCEs), which can be used as basic processing primitives. By way of example and not limitation, an SBCE may take decoded activations and respective weights as inputs, and compute partial sum (PS) for a block as shown in FIG. 7C. Moreover, each SBCE may employ an activation buffer that is used for storing the decoded activations temporarily. In implementations, the decoded activations and respective weights may be inputted into a process engine for multiplication and accumulation (i.e., addition).

Due to the nature of row pruning, sub-rows from different banks may not be aligned with each other. In implementations, in order to address this potential misalignment, a Row Alignment logic may be used to skip a computation for sub-rows that are pruned, and to assure that partial sums of sub-rows of the same row can be added or accumulated correctly.

In implementations, since all SGCEs follows the same processing pipeline, a number of functional components, which may include, but are not limited to, weight memory, index memory, a control logic for weight and index loading/storage, an index decoding logic, and a process engine, may be shared among the SGCEs. On the other hand, each SGCE may have its own inputs and hidden states. In implementations, look-up tables may be used to achieve piece-wise linear function to approximate sigmoid and tan h functions for implementations of activation functions. Moreover, a divide-and-conquer strategy may be employed for designing the control logic. In implementations, a micro-controller may be deployed in each DPE to maximize the utilization of shared resources and guarantee the functional correctness. Alternatively, in some implementations, a global control logic may exist across a plurality of DPEs, or multiple functional gates. In implementations, dividing a complex global control into a plurality of micro-controls can significantly reduce the complexity of a design, and have outstanding scalability because each DPE can operate independently, while local controllers can help to reduce the latency of communication.

Figure 8A:
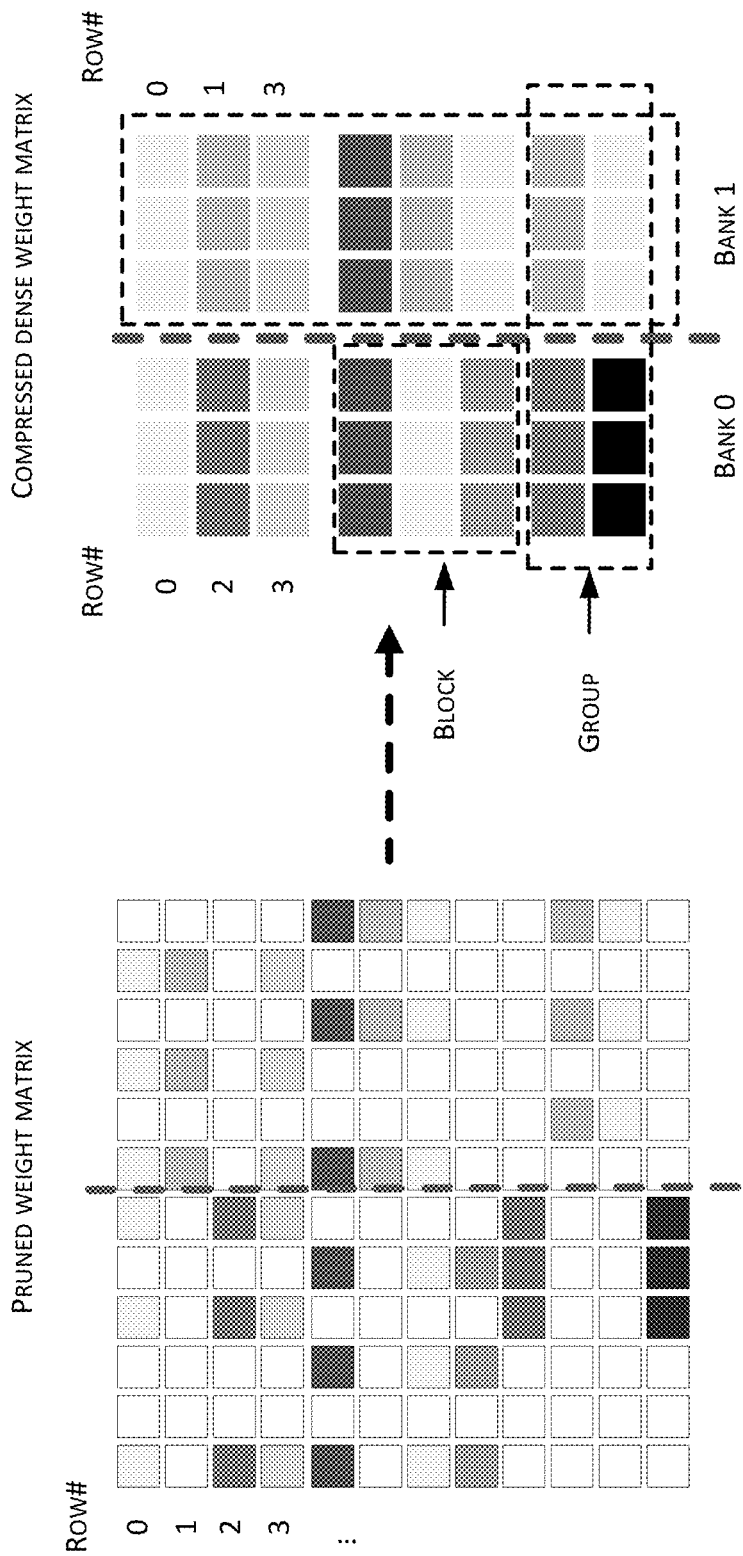
FIGS. 8A and 8B illustrate a data flow illustrating how the example hardware design described in FIGS. 7A-C can efficiently support the BRCP algorithm.
Figure 8B:
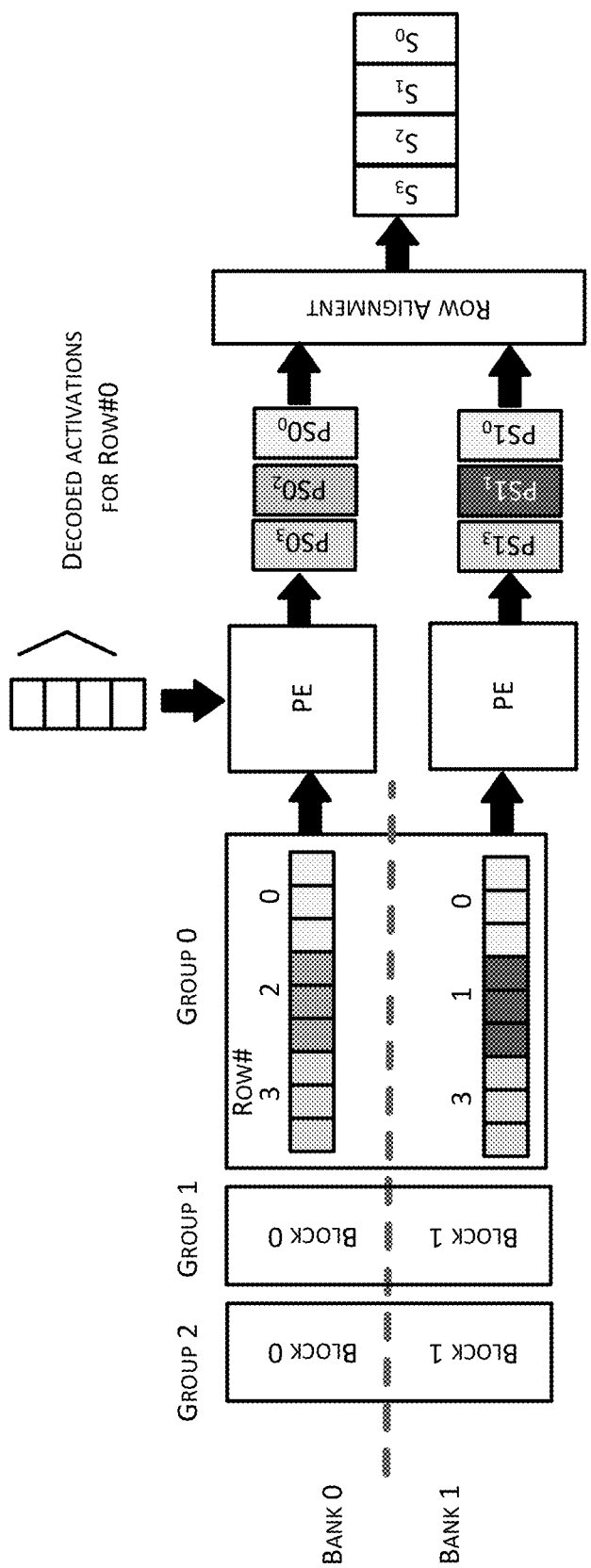

FIGS. 8A and 8B shows a data flow illustrating how the architecture described in FIGS. 7A, 7B, and 7C can efficiently support the BRCP algorithm. As described above, an input weight pattern (and hence an output weight pattern) may be divided into a plurality of banks. For the sake of description and without loss of generality, two banks are described in this example. Nevertheless, the following description can be generalized for situations when a weight pattern is divided into more than two banks.

By way of example and not limitation, the output weight pattern, which is a sparse weight matrix in this example, may be compressed and stored in a compact form as shown in FIG. 8A. The compressed or dense weight matrix may then be divided into two banks (i.e., Bank 0 and Bank 1 in this example), and each bank may be further divided into multiple blocks. Two blocks (i.e., sub-patterns) from different banks may form a group, and may be processed independently by process engines, for example, as shown in FIG. 8B.

In implementations, each sub-row in a block may be further segmented as vectors. As shown in FIG. 8B, vectors in the same sub-row are shaded in the same way. In implementations, multiple groups may be processed in parallel. As shown in FIG. 8B, vectors of each bank are fed into a respective process engine for dot product computation to produce partial sums (PS). In implementations, computations for pruned sub-rows may be skipped, while a row alignment logic may be employed to align respective partial sums from the two banks. Final results may be generated and obtained by adding up biases and applying an activation function.

In implementations, a compressed sparse row (CSR) format may further be employed to encode the output weight pattern, i.e., the sparse weight matrix, for further reduction of storage overhead, on top of the reduction of index storage cost made by the BRCP algorithm. The CSR format represents a matrix by three (one-dimensional) arrays, which include nonzero values, extents of rows, and column indices respectively. This CSR format indicates a relative distance between two nonzero elements. In implementations, indices may be loaded from an index memory and sent to an activation detector to produce proper activations that are fed into SGCEs for computing. An index decoder may be needed to select useful activations (e.g., nonzero activations) from a vector. In implementations, for the sake of performance, the decoder may be maintained at high bandwidth, which requires a plurality of instances.

In implementations, in order to address a design challenge of placing and routing these multiple high bandwidth components (e.g., index decoders), an interface width of the activation detector may be narrowed down. For example, an input interface of the activation detector as shown in FIG. 7B may be n-bit wide, where n<<m. In implementations, a ping-pang buffer may further be employed to hide the latency associated with data loading due to the time taken for computing the entire weight matrix (i.e., a weight pattern). In implementation, if one buffer is used for computing, the other buffer may be used for loading data for next layer processing. Furthermore, since a decoding rate is one activation per cycle per decoder, an aggregated output bandwidth may scale up linearly with the total number of decoders that are operating in parallel.

Figure 9:
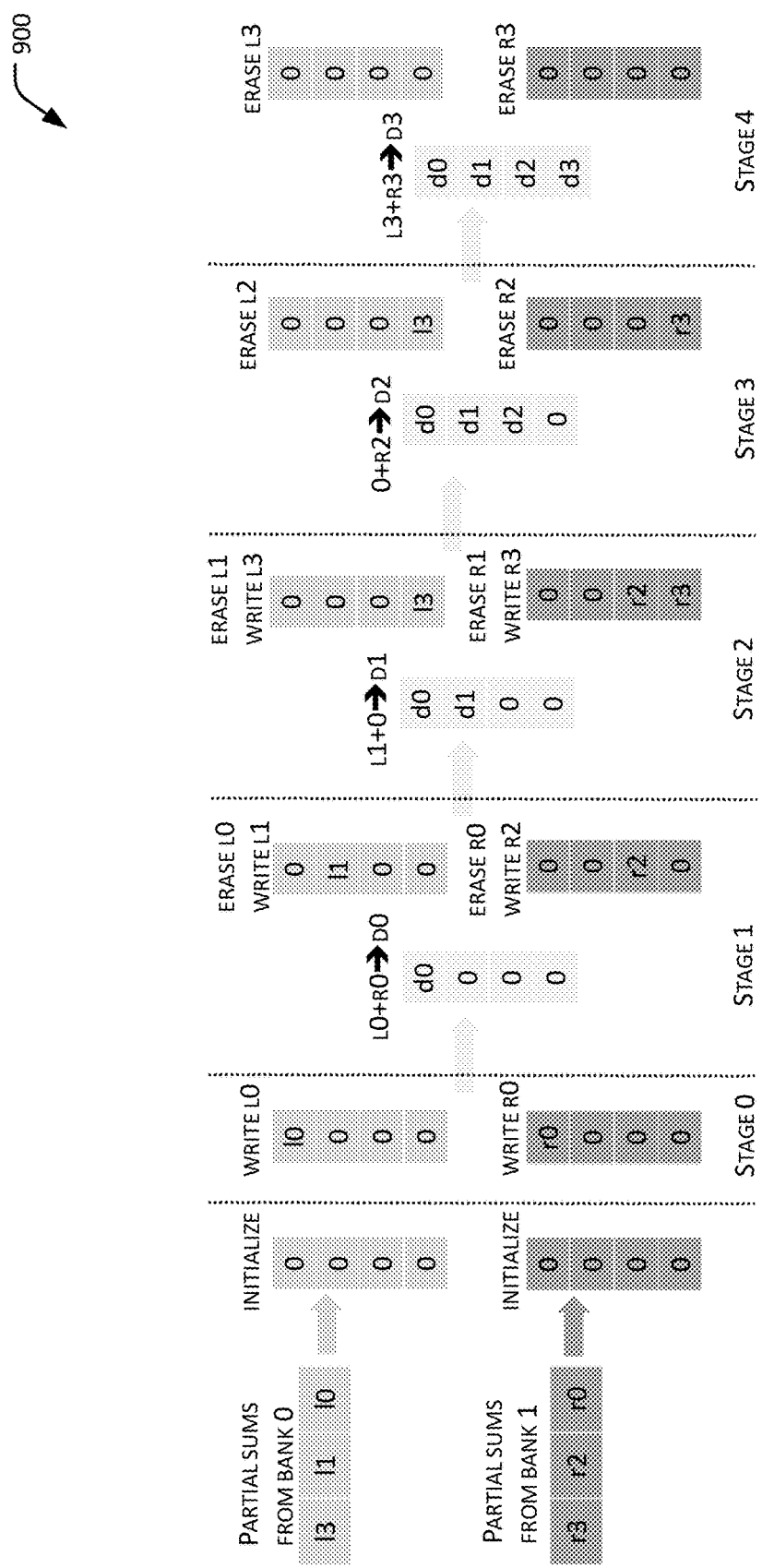
FIG. 9 illustrates an example row alignment strategy.

In implementations, partial sums of a plurality of blocks (two blocks in this example) of a group need to be summed up to produce a final result of a dot product. Since row pruning may cause some misalignments among the plurality of blocks, a row alignment scheme is proposed to address these misalignments. FIG. 9 shows an example row alignment strategy 900. In implementations, a plurality of buffers may be employed for temporarily storing partial sums generated and obtained by a plurality of blocks of a group, one buffer for each block. For example, as shown in FIG. 9, two buffers are used for temporarily storing partial sums generated and obtained by two blocks (e.g., the left block from Bank 0 and the right block from Bank 1) of a group respectively. If one half-row is pruned, a partial sum may be stored into a buffer by skipping one step, and the buffer may be reset to zero in skipping. Summation may be performed by fetching corresponding partial sums from the two buffers one by one. For example, as shown in FIG. 9, $<l_0, l_1, \ldots, l_i>$ may denote nonzero partial sums of the left block, and $<r_0, r_1, \ldots, r_i>$ may denote nonzero partial sums of the right block, wherein i represents a row index in a corresponding block. Final dot-product results may be calculated by $d_0 = l_0 +$ $r_0$, $d_1=l_1+0$, and $d_2=0+r_2$, etc. After a partial sum is fetched, a corresponding buffer entry is freed to accept new partial sums.

In implementations, due to the hierarchical and modular architecture design, the BRCP can be highly flexible to achieve various degrees of scalability and pruning ratios. Specifically, the hardware-aware pruning algorithmic design as described in the foregoing description can facilitate the utilization of hardware resources. For example, by adjusting the column sparsity $p_c$, the number of weights that are retained can be made to be a multiple of the number of process engines. Accordingly, the control design can be simplified because zero padding for sub-columns is not needed. Furthermore, the number of process engines may be designed to match the number of blocks (i.e., sub-patterns) in a group, and thus the process of decoding may have the same throughput as a process engine has, so that all units can be fully utilized. Moreover, since each DPE can operate independently and the SGPEs in each DPE are homogeneous, the architecture can be scaled by either the number of Gates or the number of groups working in parallel. Since the bandwidth of each memory bank needs to satisfy the demand of a group, the number of memory banks can also be scaled simultaneously.

Although dividing a weight pattern into two banks is used in the above examples for illustrating various implementations of the BRCP algorithm and associated hardware design, in implementations, the weight pattern can be divided into a plurality of banks which may be more than two banks, and the above implementations can be generalized accordingly to be applied to this situation.

In implementations, the algorithms described above (e.g., the BRCP algorithm, the decoding process, etc.) are suitable to be implemented by various types of hardware platforms, which may include, but are not limited to, central processing units (CPUs), graphic processing units (GPUs), field-programmable gate arrays (FPGAs), and application-specific integrated circuits (ASICs), etc. The block size and the pruning ratio as described above may be configured according to respective characteristics of different platforms to achieve optimal or desired acceleration performance. For example, due to the flexibilities of FPGAs and ASICs for supporting the foregoing decoding process (e.g., selecting corresponding activations for retained weights), the algorithm described in the foregoing description is suitable to be implemented by special-purpose processing architecture, such as the neural network processing architecture 216 as described above, and any other FPGA/ASIC-based neural network accelerators.

In implementations, the BRCP algorithm helps reducing the number of parameters of a machine learning model (e.g., the number of nonzero weights of a neural network model) and the number of computations with the parameters (e.g., the weights), and thus accelerating or speeding up computations. Furthermore, if the foregoing algorithms are implemented using special-purpose processing architecture, such as the neural network processing architecture 216 as described above, and any other FPGA/ASIC-based neural network accelerators, the number of accesses between a local memory to an external memory can be reduced, and the total number of computations can also be reduced. Moreover, with proper configurations, the processing performance of an accelerator may further be improved.

In implementations, for a given accuracy, a larger block size (i.e., a larger size of a sub-pattern) facilitates achieving a higher decoding efficiency, because of a higher number of weights that can share a same index, and thus leads to a higher average processing speed for arithmetic computations. On the other hand, a larger block size may lead to a lower sparsity that is achievable, and thus a lower achievable reduction in the number of computations. In implementations, given a certain block size, a higher accuracy requirement may result in a lower sparsity, and a lower accuracy requirement may result in a higher sparsity. Therefore, given a particular application and accuracy requirement, a block size and a degree of sparsity may be jointly considered to achieve an optimal or desired computational acceleration.

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method for reducing memory and computational costs associated with a weight pattern, the method comprising: receiving an input weight pattern; and obtaining an output weight pattern from the input weight pattern based on a block-wise row and column pruning method, the block-wise row and column pruning method comprising: partitioning the input weight pattern into a mesh network of sub-patterns, each row of the input weight pattern comprising sub-rows of a first number of sub-patterns, and each column of the input weight pattern comprising sub-columns of a second number of sub-patterns; pruning respective one or more sub-columns from each sub-pattern to achieve a predetermined column sparsity; and pruning respective one or more sub-rows from each sub-pattern to achieve a predetermined row sparsity under a constraint that, for each row of the input weight pattern, at least one sub-row of a sub-pattern in a respective row of the input weight pattern is not pruned.

Clause 2: The method of Clause 1, wherein pruning a sub-column of respective one or more sub-columns comprises setting all weight values in the sub-column as zeros.

Clause 3: The method of Clause 1, further comprising compressing the output weight pattern in a compact form by removing sub-columns and sub-rows having weight values being all zeros from the output weight pattern.

Clause 4: The method of Clause 1, wherein pruning the respective one or more sub-columns from each sub-pattern of the mesh network of sub-patterns to achieve the predetermined column sparsity comprises: pruning a sub-column of a sub-pattern in response to determining that a norm of the sub-column of the sub-pattern is less than a first predetermined threshold.

Clause 5: The method of Clause 4, wherein the norm of the sub-column comprises a square root of a sum of each element of the sub-column being squared.

Clause 6: The method of Clause 1, wherein pruning the respective one or more sub-rows from each sub-pattern of the mesh network of sub-patterns to achieve the predetermined row sparsity under the constraint comprises: pruning a sub-row of a sub-pattern in response to determining that a norm of the sub-row of the sub-pattern is less than a second predetermined threshold.

Clause 7: The method of Clause 6, wherein pruning the respective one or more sub-rows from each sub-pattern of the mesh network of sub-patterns to achieve the predetermined row sparsity under the constraint further comprises: determining that respective norms of all sub-rows in a certain row of the input weight pattern are less than the second predetermined threshold; and keeping at least one sub-row having a norm that is highest among the respective norms of all the sub-rows in the certain row of the input weight pattern, and pruning remaining sub-rows in the certain sub-row of the input weight pattern.

Clause 8: The method of Clause 1, wherein pruning respective one or more sub-columns from each sub-pattern to achieve a predetermined column sparsity comprises pruning the respective one or more sub-columns from each sub-pattern so that a sparsity of sub-columns in the output weight pattern is within a predetermined range around the predetermined column sparsity.

Clause 9: One or more computer-readable media storing executable instructions that, when executed by one or more processors, cause the one or more processors to perform acts comprising: receiving an input weight pattern; and obtaining an output weight pattern from the input weight pattern based on a block-wise row and column pruning method, the block-wise row and column pruning method comprising: partitioning the input weight pattern into a mesh network of sub-patterns, each row of the input weight pattern comprising sub-rows of a first number of sub-patterns, and each column of the input weight pattern comprising sub-columns of a second number of sub-patterns; pruning respective one or more sub-columns from each sub-pattern to achieve a predetermined column sparsity; and pruning respective one or more sub-rows from each sub-pattern to achieve a predetermined row sparsity under a constraint that, for each row of the input weight pattern, at least one sub-row of a sub-pattern in a respective row of the input weight pattern is not pruned.

Clause 10: The one or more computer-readable media of Clause 9, wherein pruning a sub-column of respective one or more sub-columns comprises setting all weight values in the sub-column as zeros.

Clause 11: The one or more computer-readable media of Clause 9, the acts further comprising compressing the output weight pattern in a compact form by removing sub-columns and sub-rows having weight values being all zeros from the output weight pattern.

Clause 12: The one or more computer-readable media of Clause 9, wherein pruning the respective one or more sub-columns from each sub-pattern of the mesh network of sub-patterns to achieve the predetermined column sparsity comprises: pruning a sub-column of a sub-pattern in response to determining that a norm of the sub-column of the sub-pattern is less than a first predetermined threshold.

Clause 13: The one or more computer-readable media of Clause 12, wherein the norm of the sub-column comprises a square root of a sum of each element of the sub-column being squared.

Clause 14: The one or more computer-readable media of Clause 9, wherein pruning the respective one or more sub-rows from each sub-pattern of the mesh network of sub-patterns to achieve the predetermined row sparsity under the constraint comprises: pruning a sub-row of a sub-pattern in response to determining that a norm of the sub-row of the sub-pattern is less than a second predetermined threshold.

Clause 15: The one or more computer-readable media of Clause 4, wherein pruning the respective one or more sub-rows from each sub-pattern of the mesh network of sub-patterns to achieve the predetermined row sparsity under the constraint further comprises: determining that respective norms of all sub-rows in a certain row of the input weight pattern are less than the second predetermined threshold; and keeping at least one sub-row having a norm that is highest among the respective norms of all the sub-rows in the certain row of the input weight pattern, and pruning remaining sub-rows in the certain sub-row of the input weight pattern.

Clause 16: The one or more computer-readable media of Clause 9, wherein pruning respective one or more sub-columns from each sub-pattern to achieve a predetermined column sparsity comprises pruning the respective one or more sub-columns from each sub-pattern so that a sparsity of sub-columns in the output weight pattern is within a predetermined range around the predetermined column sparsity.

Clause 17: A system comprising: one or more neural network processing units; and memory storing executable instructions that, when executed by the one or more neural network processing units, cause the one or more neural network processing units to perform acts comprising: receiving an input weight pattern; and obtaining an output weight pattern from the input weight pattern based on a block-wise row and column pruning method, the block-wise row and column pruning method comprising: partitioning the input weight pattern into a mesh network of sub-patterns, each row of the input weight pattern comprising sub-rows of a first number of sub-patterns, and each column of the input weight pattern comprising sub-columns of a second number of sub-patterns; pruning respective one or more sub-columns from each sub-pattern to achieve a predetermined column sparsity; and pruning respective one or more sub-rows from each sub-pattern to achieve a predetermined row sparsity under a constraint that, for each row of the input weight pattern, at least one sub-row of a sub-pattern in a respective row of the input weight pattern is not pruned.

Clause 18: The system of Clause 17, wherein pruning a sub-column of respective one or more sub-columns comprises setting all weight values in the sub-column as zeros, and wherein the acts further comprise compressing the output weight pattern in a compact form by removing sub-columns and sub-rows having weight values being all zeros from the output weight pattern.

Clause 19: The system of Clause 17, wherein pruning the respective one or more sub-columns from each sub-pattern of the mesh network of sub-patterns to achieve the predetermined column sparsity comprises: pruning a sub-column of a sub-pattern in response to determining that a norm of the sub-column of the sub-pattern is less than a first predetermined threshold.

Clause 20: The system of Clause 17, wherein pruning the respective one or more sub-rows from each sub-pattern of the mesh network of sub-patterns to achieve the predetermined row sparsity under the constraint comprises: pruning a sub-row of a sub-pattern in response to determining that a norm of the sub-row of the sub-pattern is less than a second predetermined threshold; determining that respective norms of all sub-rows in a certain row of the input weight pattern are less than the second predetermined threshold; and keeping at least one sub-row having a norm that is highest among the respective norms of all the sub-rows in the certain row of the input weight pattern, and pruning remaining sub-rows in the certain sub-row of the input weight pattern.

What is claimed is:
1. A method implemented by a hierarchical hardware, the method comprising:

receiving an input weight pattern of a neural network model from a computing device, and storing the input weight pattern into a weight memory of the hierarchical hardware;

obtaining an output weight pattern configured to facilitate parallel computations from the input weight pattern based on a block-wise row and column pruning method, the block-wise row and column pruning method comprising:

partitioning the input weight pattern into a mesh network of sub-patterns, each row of the input weight pattern comprising sub-rows of a first number of sub-patterns, and each column of the input weight pattern comprising sub-columns of a second number of sub-patterns;

sending each sub-pattern of the sub-patterns from the weight memory to a respective sparse group compute engine (SGCE) of a plurality of sparse group compute engines of the hierarchical hardware, the weight memory being shared and accessible by the plurality of sparse group compute engines;

pruning, by the respective SGCE, respective one or more sub-columns from each sub-pattern to achieve a predetermined column sparsity; and pruning, by the respective SGCE, respective one or more sub-rows from each sub-pattern to achieve a predetermined row sparsity under a constraint that, for each row of the input weight pattern, at least one sub-row of a sub-pattern in a respective row of the input weight pattern is not pruned; and sending the output weight pattern to the computing device.

2. The method of claim 1, wherein pruning the respective one or more sub-columns comprises setting all weight values in the respective one or more sub-columns as zeros.

3. The method of claim 1, further comprising compressing the output weight pattern in a compact form by removing sub-columns and sub-rows having weight values being all zeros from the output weight pattern.

4. The method of claim 1, wherein pruning the respective one or more sub-columns from each sub-pattern of the mesh network of sub-patterns to achieve the predetermined column sparsity comprises: pruning a sub-column of a sub-pattern in response to determining that a norm of the sub-column of the sub-pattern is less than a first predetermined threshold.

5. The method of claim 4, wherein the norm of the sub-column comprises a square root of a sum of each element of the sub-column being squared.

6. The method of claim 1, wherein pruning the respective one or more sub-rows from each sub-pattern of the mesh network of sub-patterns to achieve the predetermined row sparsity under the constraint comprises: pruning a sub-row of a sub-pattern in response to determining that a norm of the sub-row of the sub-pattern is less than a second predetermined threshold.

7. The method of claim 6, wherein pruning the respective one or more sub-rows from each sub-pattern of the mesh network of sub-patterns to achieve the predetermined row sparsity under the constraint further comprises:

determining that respective norms of all sub-rows in a certain row of the input weight pattern are less than the second predetermined threshold; and keeping at least one sub-row having a norm that is highest among the respective norms of all the sub-rows in the certain row of the input weight pattern, and pruning remaining sub-rows in the certain sub-row of the input weight pattern.

8. The method of claim 1, wherein pruning respective one or more sub-columns from each sub-pattern to achieve a predetermined column sparsity comprises pruning the respective one or more sub-columns from each sub-pattern so that a sparsity of sub-columns in the output weight pattern is within a predetermined range around the predetermined column sparsity.

9. One or more computer-readable media storing executable instructions that, when executed by one or more processors of a hierarchical hardware, cause the one or more processors to perform acts comprising:

receiving an input weight pattern of a neural network model from a computing device, and storing the input weight pattern into a weight memory of the hierarchical hardware;

obtaining an output weight pattern from the input weight pattern configured to facilitate parallel computations based on a block-wise row and column pruning method, the block-wise row and column pruning method comprising:

partitioning the input weight pattern into a mesh network of sub-patterns, each row of the input weight pattern comprising sub-rows of a first number of sub-patterns, and each column of the input weight pattern comprising sub-columns of a second number of sub-patterns;

sending each sub-pattern of the sub-patterns from the weight memory to a respective sparse group compute engine (SGCE) of a plurality of sparse group compute engines of the hierarchical hardware, the weight memory being shared and accessible by the plurality of sparse group compute engines;

pruning, by the respective SGCE, respective one or more sub-columns from each sub-pattern to achieve a predetermined column sparsity; and pruning, by the respective SGCE, respective one or more sub-rows from each sub-pattern to achieve a predetermined row sparsity under a constraint that, for each row of the input weight pattern, at least one sub-row of a sub-pattern in a respective row of the input weight pattern is not pruned; and sending the output weight pattern to the computing device.

10. The one or more computer-readable media of claim 9, wherein pruning the respective one or more sub-columns comprises setting all weight values in the respective one or more sub-columns as zeros.

11. The one or more computer-readable media of claim 9, the acts further comprising compressing the output weight pattern in a compact form by removing sub-columns and sub-rows having weight values being all zeros from the output weight pattern.

12. The one or more computer-readable media of claim 9, wherein pruning the respective one or more sub-columns from each sub-pattern of the mesh network of sub-patterns to achieve the predetermined column sparsity comprises: pruning a sub-column of a sub-pattern in response to determining that a norm of the sub-column of the sub-pattern is less than a first predetermined threshold.

13. The one or more computer-readable media of claim 12, wherein the norm of the sub-column comprises a square root of a sum of each element of the sub-column being squared.

14. The one or more computer-readable media of claim 9, wherein pruning the respective one or more sub-rows from each sub-pattern of the mesh network of sub-patterns to achieve the predetermined row sparsity under the constraint comprises: pruning a sub-row of a sub-pattern in response to determining that a norm of the sub-row of the sub-pattern is less than a second predetermined threshold.

15. The one or more computer-readable media of claim 14, wherein pruning the respective one or more sub-rows from each sub-pattern of the mesh network of sub-patterns to achieve the predetermined row sparsity under the constraint further comprises:
determining that respective norms of all sub-rows in a certain row of the input weight pattern are less than the second predetermined threshold; and
keeping at least one sub-row having a norm that is highest among the respective norms of all the sub-rows in the certain row of the input weight pattern, and pruning remaining sub-rows in the certain sub-row of the input weight pattern.

16. The one or more computer-readable media of claim 9, wherein pruning respective one or more sub-columns from each sub-pattern to achieve a predetermined column sparsity comprises pruning the respective one or more sub-columns from each sub-pattern so that a sparsity of sub-columns in the output weight pattern is within a predetermined range around the predetermined column sparsity.

17. A system comprising:
a hierarchical hardware comprising: one or more neural network processing units; and memory storing executable instructions that, when executed by the one or more neural network processing units, cause the one or more neural network processing units to perform acts comprising:
receiving an input weight pattern of a neural network model from a computing device, and storing the input weight pattern into a weight memory of the hierarchical hardware;
obtaining an output weight pattern from the input weight pattern configured to facilitate parallel computations based on a block-wise row and column pruning method, the block-wise row and column pruning method comprising:
partitioning the input weight pattern into a mesh network of sub-patterns, each row of the input weight pattern comprising sub-rows of a first number of sub-patterns, and each column of the input weight pattern comprising sub-columns of a second number of sub-patterns;
sending each sub-pattern of the sub-patterns from the weight memory to a respective sparse group compute engine (SGCE) of a plurality of sparse group compute engines of the hierarchical hardware, the weight memory being shared and accessible by the plurality of sparse group compute engines;
pruning, by the respective SGCE, respective one or more sub-columns from each sub-pattern to achieve a predetermined column sparsity; and
pruning, by the respective SGCE, respective one or more sub-rows from each sub-pattern to achieve a predetermined row sparsity under a constraint that, for each row of the input weight pattern, at least one sub-row of a sub-pattern in a respective row of the input weight pattern is not pruned; and
sending the output weight pattern to the computing device.

18. The system of claim 17, wherein pruning the respective one or more sub-columns comprises setting all weight values in the respective one or more sub-columns as zeros, and wherein the acts further comprise compressing the output weight pattern in a compact form by removing sub-columns and sub-rows having weight values being all zeros from the output weight pattern.

19. The system of claim 17, wherein pruning the respective one or more sub-columns from each sub-pattern of the mesh network of sub-patterns to achieve the predetermined column sparsity comprises: pruning a sub-column of a sub-pattern in response to determining that a norm of the sub-column of the sub-pattern is less than a first predetermined threshold.

20. The system of claim 17, wherein pruning the respective one or more sub-rows from each sub-pattern of the mesh network of sub-patterns to achieve the predetermined row sparsity under the constraint comprises:
pruning a sub-row of a sub-pattern in response to determining that a norm of the sub-row of the sub-pattern is less than a second predetermined threshold;
determining that respective norms of all sub-rows in a certain row of the input weight pattern are less than the second predetermined threshold; and
keeping at least one sub-row having a norm that is highest among the respective norms of all the sub-rows in the certain row of the input weight pattern, and pruning remaining sub-rows in the certain sub-row of the input weight pattern.

* * * * *